(12) United States Patent
Hochmayr et al.

(10) Patent No.: US 8,910,535 B2
(45) Date of Patent: Dec. 16, 2014

(54) VEHICLE TRANSMISSION

(75) Inventors: Markus Hochmayr, Krenglbach (AT);
Erik Hoser, Bad Wimsbach-Neydharting (AT); Gerhard Wiesinger, Lenzing (AT)

(73) Assignee: BRP-Powertrain GmbH & Co. KG, Gunskirchen (AT)

( * ) Notice: Subject to any disclaimer, the term of this patent is extended or adjusted under 35 U.S.C. 154(b) by 228 days.

(21) Appl. No.: 13/696,209

(22) PCT Filed: May 3, 2010

(86) PCT No.: PCT/US2010/033342
§ 371 (c)(1),
(2), (4) Date: Nov. 5, 2012

(87) PCT Pub. No.: WO2011/139264
PCT Pub. Date: Nov. 10, 2011

(65) Prior Publication Data
US 2013/0062136 A1   Mar. 14, 2013

(51) Int. Cl.
*F16H 3/08* (2006.01)
*B60K 20/00* (2006.01)
*B60K 23/00* (2006.01)
*F16H 63/18* (2006.01)
*F16H 3/083* (2006.01)
*B60K 23/08* (2006.01)

(52) U.S. Cl.
CPC ........... *F16H 3/083* (2013.01); *B60Y 2200/124* (2013.01); *B60K 23/00* (2013.01); *F16H 63/18* (2013.01); *B60K 23/08* (2013.01)
USPC .............................................. 74/325; 74/335

(58) Field of Classification Search
CPC .. F16H 3/089; F16H 2063/3076; F16H 63/32
USPC ........................ 74/325, 335, 473.36, 473.37
See application file for complete search history.

(56) References Cited

U.S. PATENT DOCUMENTS

| | | | | |
|---|---|---|---|---|
| 3,537,335 | A | * | 11/1970 | Aizpiri Ezpeleta ........... 477/123 |
| 3,893,345 | A | * | 7/1975 | Sisson et al. .................... 74/331 |
| 4,038,882 | A | | 8/1977 | Keller |
| 7,055,383 | B2 | * | 6/2006 | Kawakubo et al. ............. 73/181 |
| 7,305,900 | B2 | * | 12/2007 | Suzuki et al. ................... 74/340 |
| 7,617,904 | B1 | | 11/2009 | Einboeck et al. |
| 2002/0152823 | A1 | | 10/2002 | Wild et al. |
| 2007/0209460 | A1 | | 9/2007 | Baldwin et al. |

OTHER PUBLICATIONS

International Search Report from PCT/US2010/033342; dated Jun. 23, 2010; Blaine R. Copenheaver.

* cited by examiner

*Primary Examiner* — Ha D Ho
(74) *Attorney, Agent, or Firm* — BCF LLP

(57) ABSTRACT

A vehicle transmission has at least three transmission gears. The at least three transmission gears are selectively engaged by at least three shifting sleeves. The shifting sleeves are actuated by two shift forks. Each shift fork is moved by a corresponding shift drum. The shift drums are disposed on a shift drum shaft. By rotating the shift drum shaft, each of the at least three transmission gears can be engaged in sequence. The two shift drums are spring biased.

15 Claims, 21 Drawing Sheets

VEHICLE TRANSMISSION

TECHNICAL FIELD

The present invention relates to a vehicle transmission.

BACKGROUND

Vehicle transmissions typically have multiple gears. For a given speed of rotation of an input shaft of the transmission, each gear when engaged results in a different speed of rotation and/or direction of rotation of an output shaft of the transmission. The gears typically need to be engaged sequentially.

One example of a vehicle transmission has a park position, a reverse position, a neutral position, a high position, and low position. In the park position, the output shaft is locked and cannot rotate. In the reverse position, the output shaft rotates in a direction which results in the vehicle in which the transmission is provided to move in a reverse direction. In the high and low positions, the output shaft rotates in a direction which results in the vehicle in which the transmission is provided to move in a forward direction. In the low position, the output shaft rotates slower than in the high position, however more torque is applied in the low position than in the high position. The operator of the vehicle having the transmission selects the position of the transmission via a gear selector having positions corresponding to each of the positions of the transmission.

One typical shifting pattern, or sequence, in which the gears need to be engaged, of the type of transmission described above is sequentially: park, reverse, neutral, high, and low. Therefore, to get from the park position to the low position, the operator of the vehicle will have to engage the reverse, neutral, and high positions before finally engaging the low position. As would be understood, to get back to the park position from the low position, the positions have to be engaged in the reverse sequence.

In some applications, such as in utility vehicles, the operator of the vehicle often needs to switch between the low position and the reverse position. This would be the case for example when the vehicle is provided with a plow and is therefore being used to plow. As explained above, to change from one of the low and the reverse positions to the other of the low and the reverse positions, the operator needs to first engage the transmission into its neutral and high positions. Transmissions typically require that the gear (or gears) corresponding to the selected transmission position needs to be engaged before the following transmission position in the sequence can be selected. However, when the operator of the vehicle wants to select a position of the transmission, it is not uncommon that the gear (or gears) corresponding to this position are not properly aligned with the engagement mechanism being used to connect it to the output shaft. This is sometimes referred to as a dog-on-dog condition. When this occurs, the operator is not capable of positioning the gear selector in the proper position until the gear is properly aligned with the engagement mechanism. This increases the amount of time necessary to get from one gear position to the other. It can also be somewhat upsetting to the operator to often have difficulty in engaging the gears, especially in the type of application described above where constant transmission position changes are necessary.

Therefore, there is a need for a vehicle transmission which facilitates the engagement of the gears of the transmission.

SUMMARY

Example embodiments of a vehicle transmission according to the present invention ameliorate at least some of the inconveniences present in the prior art.

An example embodiment of the vehicle transmission has at least three transmission gears. The at least three transmission gears are selectively engaged by shifting sleeves. The shifting sleeves are actuated by two shift forks. Each shift fork is moved by a corresponding shift drum. The shift drums are disposed on a shift drum shaft. By rotating the shift drum shaft, each of the at least three transmission gears can be engaged in sequence. The two shift drums are spring biased such that for at least two of the gears, should the corresponding one of the at least three shifting sleeves not be properly aligned with the gear for engagement therewith, the shift drum will move on the shift drum shaft and compress its corresponding spring, thus permitting the shift drum shaft to move to its predetermined position for the selected gear even though the gear is not engaged. Once the shifting sleeve is properly aligned with the gear, the spring pushes the shift drum back to its default position, which in turn moves the shifting sleeve into engagement with the gear.

The above arrangement facilitates operation of the vehicle transmission by permitting the shift drum shaft to be moved into position even though the transmission gear to be engaged for this position is not immediately engaged.

Another advantage from the above arrangement is that shifting from one shifting position to another is made easier since at least two of the transmission gears do not need to be actively engaged before having to move to the next shifting position in the sequence. For at least two of the shifting positions, since the shift drum shaft can be moved into position for a given shifting position even though the transmission gear corresponding to this shifting position is not engaged, the shifting drum shaft can be moved to the next shifting position in the sequence of shifting positions even if the transmission gear corresponding to the current shifting position has not been engaged.

For example, a vehicle transmission has a reverse position, a neutral position, a high position, and a low position to be selected sequentially. By having two shift drums that are spring biased so as to move when the transmission gears corresponding to the reverse position and the high position cannot be immediately engaged when the shift drum shaft is rotated to positions corresponding to these shifting positions, an operator of a vehicle having the transmission can more easily shift from the low position to the reverse position. This is because from the low position, the operator can go directly to the reverse position without having to wait for the transmission gears corresponding to the high and reverse positions to be engaged thanks to the spring biased shift drums (no transmission gear is engaged in the neutral position). Similarly, the operator can more easily shift from the reverse position to the low position, because from the reverse position the operator can go directly to the low position without having to wait for the transmission gear corresponding to the high position to be engaged thanks to the spring biased shift drum.

Additional and/or alternative features, aspects, and advantages of embodiments of the vehicle transmission will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
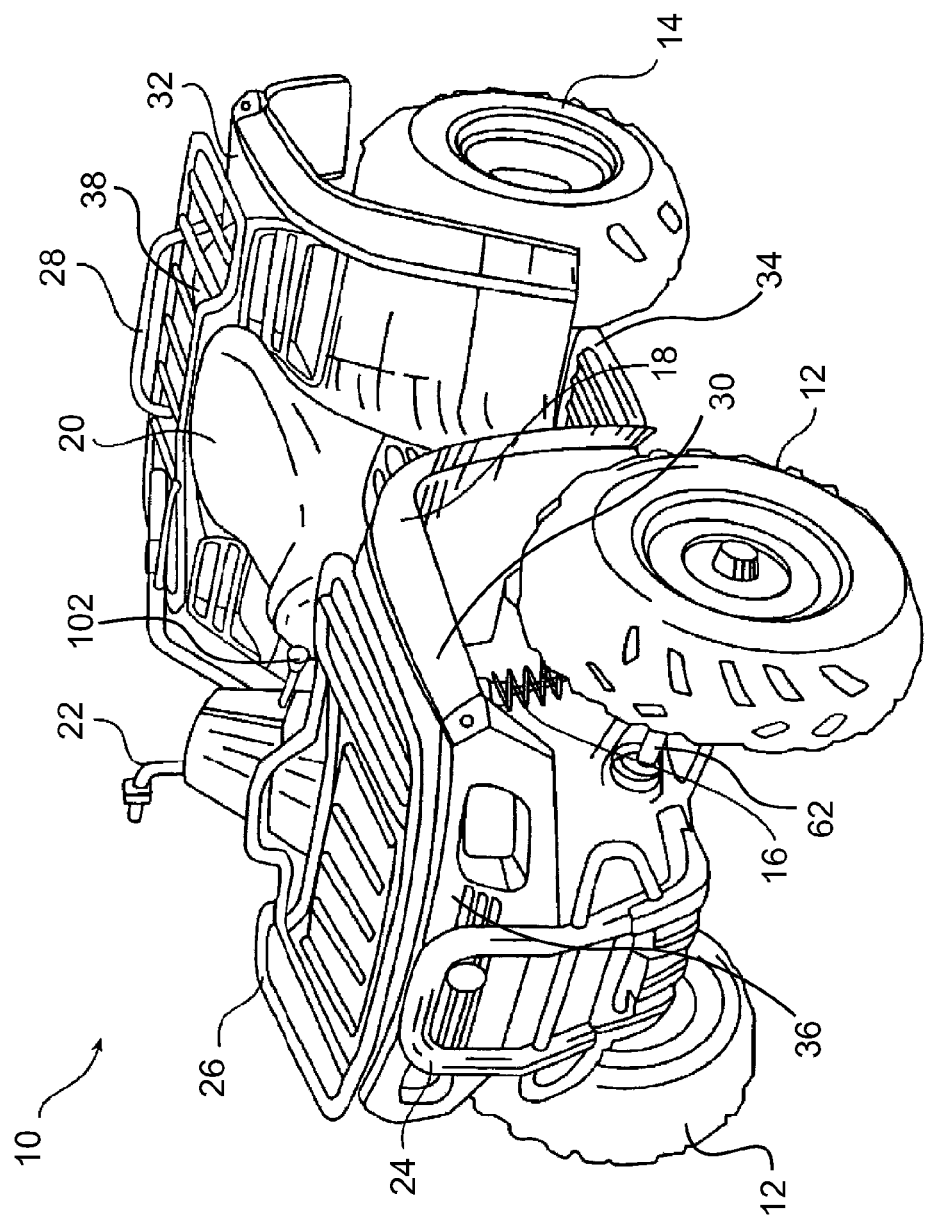
FIG. 1 is a perspective view taken from a front, left side of an all-terrain vehicle (ATV) having an example embodiment of the transmission.

FIG. 1 illustrates an all-terrain vehicle (ATV) 10 provided with an example embodiment of a transmission 100 in accordance with aspects of the invention. It should be understood that the transmission 100 could be used in combination with other types of vehicles, such as, for example, side-by-side off-road vehicles, sometimes referred to as UTVs.

The ATV 10 has two front wheels 12 and two rear wheels 14 operatively mounted to a frame (not shown) of the ATV 10. Each of the wheels 12, 14 is provided with a suspension assembly 16 (only one of which is shown) extending between its corresponding wheel and the frame. A body 18 is mounted to the frame. The ATV 10 has a straddle seat 20 disposed on the body 18 and positioned rearwardly of a handlebar 22. The handlebar 22 forms part of the steering system of the ATV 10 and is operatively connected to the front wheels 12 to transfer steering commands thereto. A gear selector 102, in the form of a hand actuated lever, is mounted near the handlebar 22. It is contemplated that the gear selector 102 could alternatively be a pedal, a finger actuated lever (or levers), or any other suitable type of gear selector. The operator of the ATV 10 uses the gear selector 102 to select a shift position of the transmission 100 as described in greater detail below. The ATV 10 also features a front bumper 24, a front carriage rack 26 and a rear carriage rack 28 disposed over the body 18. The body 18 includes front and rear fenders 30 and 32 respectively. Footrests 34 are disposed on either side of the seat 20 and join the front and rear fenders 30, 32. Fairing elements 36 and 38 cover the front and rear portions of the ATV 10 respectively.

Figure 2:
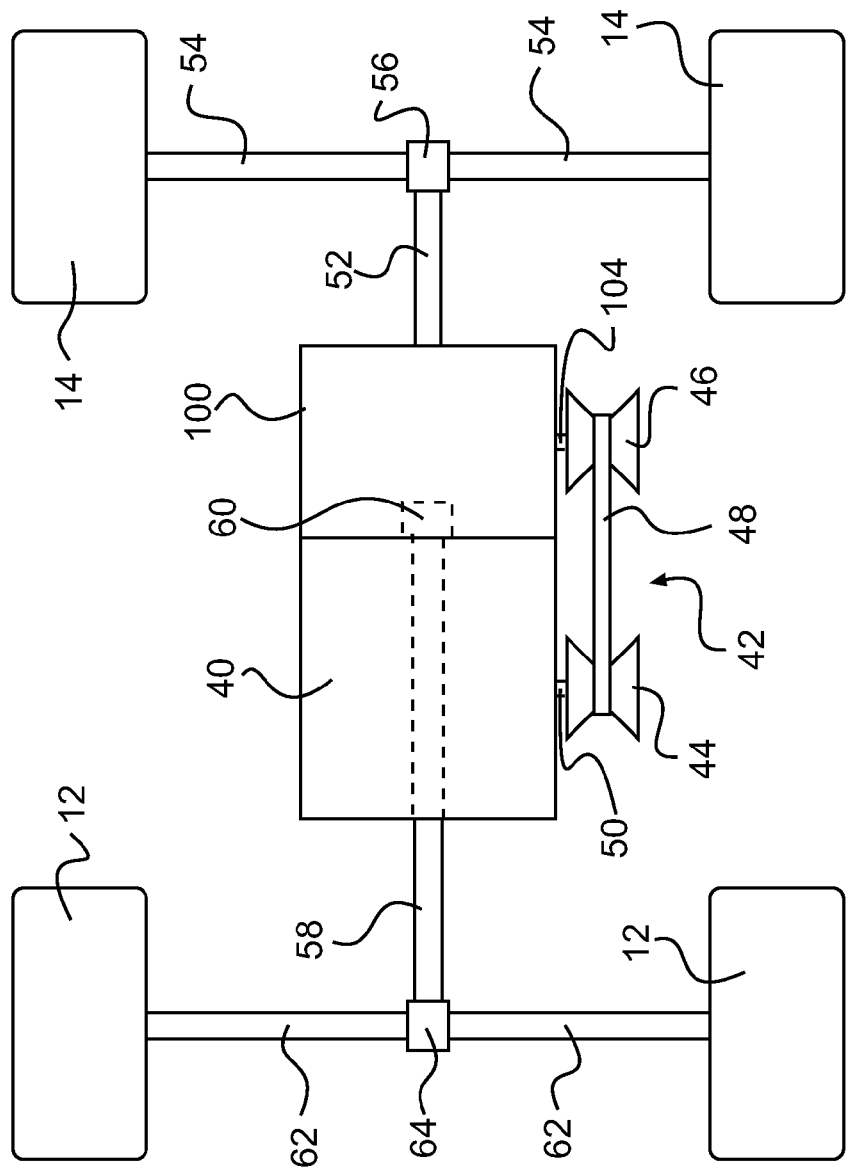
FIG. 2 is a schematic illustration of a top view of a drivetrain of the ATV of FIG. 1.

Turning now to FIG. 2, a drivetrain of the ATV 10 will be described. An engine 40 of the ATV 10 transmits torque to the transmission 100 via a continuously variable transmission (CVT) 42. The CVT 42 includes a driving pulley 44, a driven pulley 46, and a belt 48. The driving pulley 44 is mounted on an output shaft 50 of the engine 40. The driven pulley 46 is mounted on an input shaft 104 of the transmission 100. The belt 48 transmits torque from the driving pulley 44 to the driven pulley 46. An output shaft 106 (not shown in FIG. 2, but shown in FIG. 5) of the transmission 100 is operatively connected to the wheels 12, 14 as described below to transmit torque from the engine 40 to the wheels 12, 14. The output shaft 106 is connected to a rear driveshaft 52. The rear driveshaft 52 is connected to rear axles 54 via a rear differential 56. The rear axles 54 are connected to the rear wheels 14. The output shaft 106 is selectively connected to a front driveshaft 58 via a clutch 60. The clutch 60 can be operated by the operator of the ATV 10 to select between an all-wheel drive mode (i.e. with wheels 12 and 14 driven by the engine 40) and a two-wheel drive mode (i.e. with only the rear wheels 14 driven by the engine 40). The front driveshaft 58 passes through the engine 40. The front driveshaft 58 is connected to front axles 62 via a front differential 64. The front axles 64 are connected to the front wheels 12.

Figure 3:
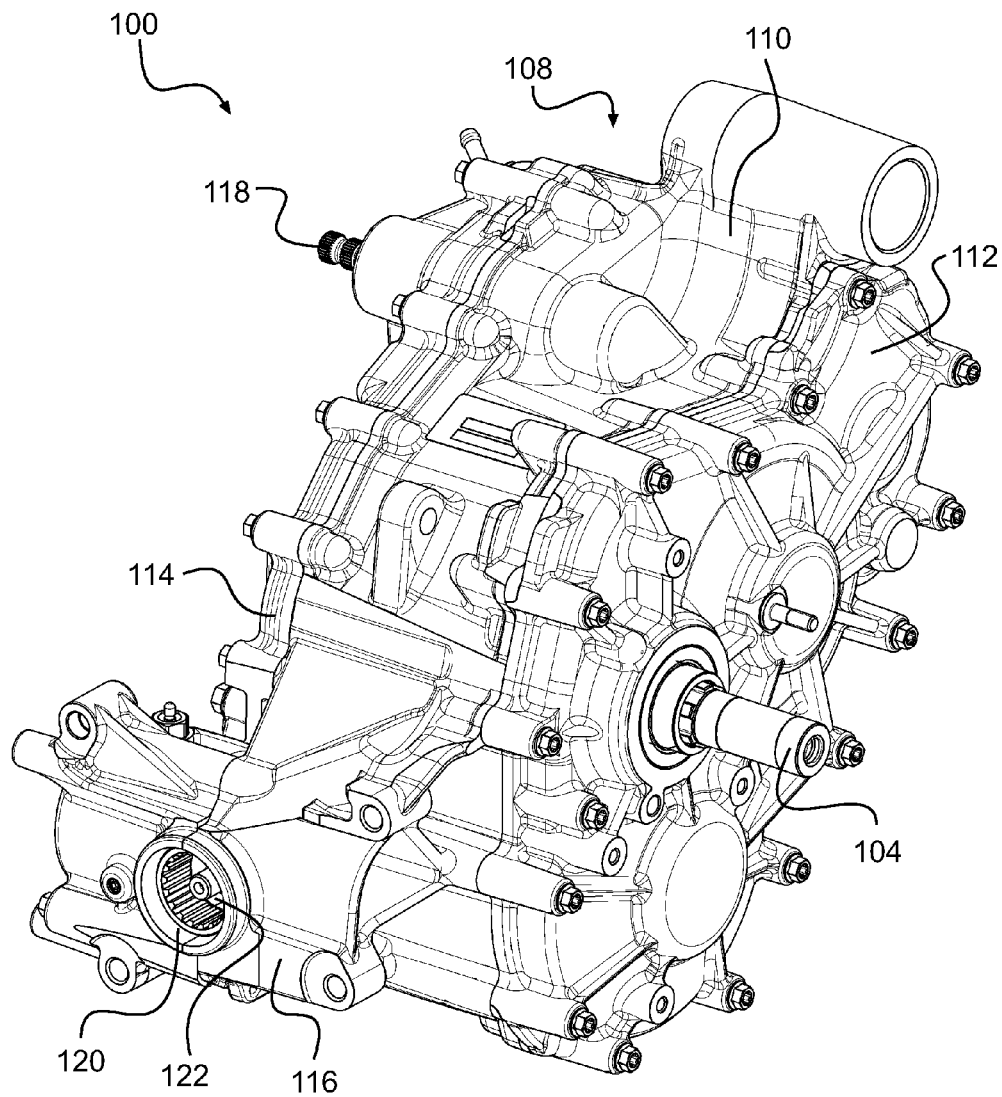
FIG. 3 is a perspective view taken from a top, front, left side of the example embodiment of the transmission of the ATV of FIG. 1.
Figure 4:
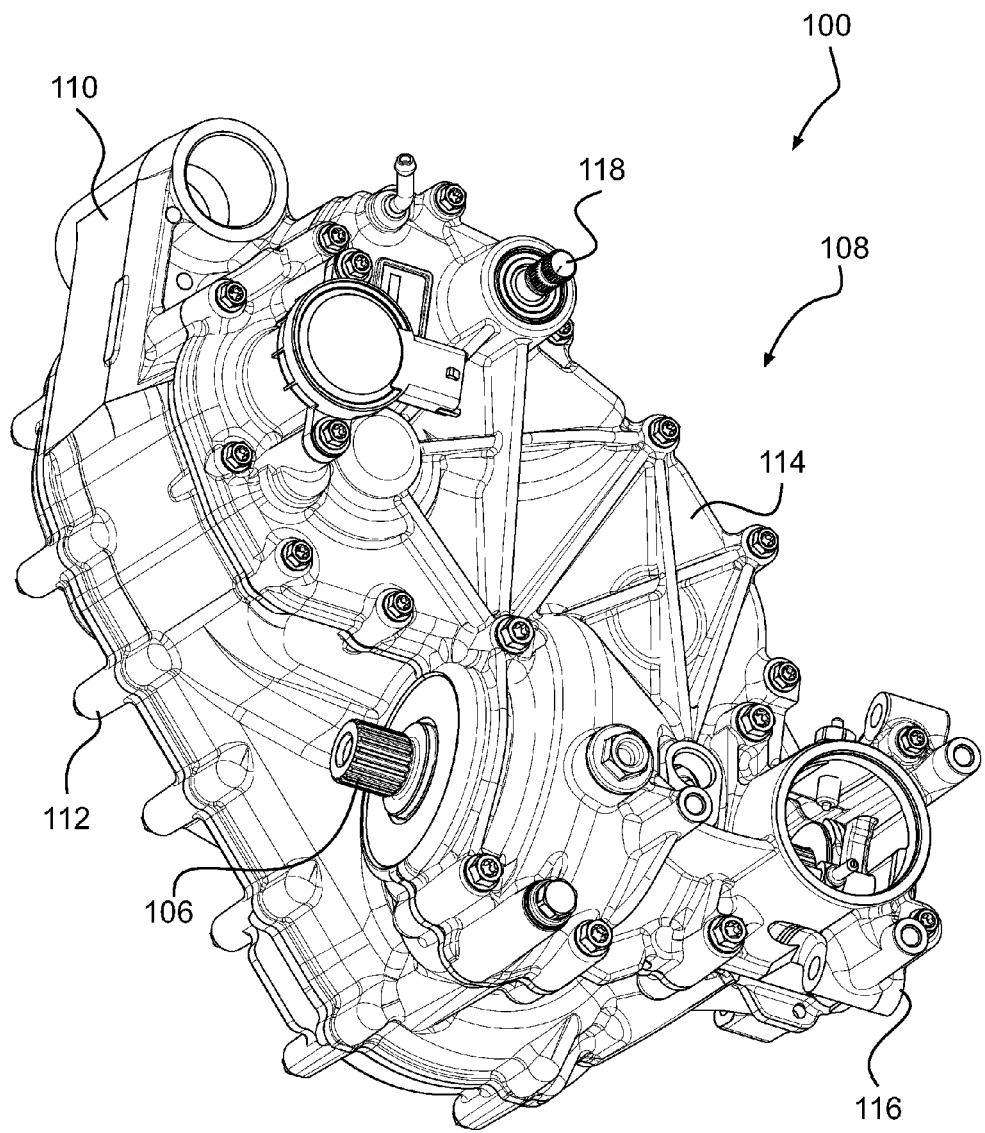
FIG. 4 is a perspective view taken from a bottom, rear, right side of the transmission of FIG. 3.

Turning now to FIGS. 3 to 8, the transmission 100 will be described in more detail. As seen in FIGS. 3 and 4, the transmission 100 has a housing 108. The housing 108 is made of a central housing portion 110 and two side covers 112, 114. As can be seen, the side covers 112, 114 are fastened to the central housing portion 110 by a plurality of bolts. The housing 108 forms a mounting plate 116 for mounting the transmission 100 to the engine 40. The input shaft 104 of the transmission 100 extends through the side cover 112 such that the driven pulley 46 can be mounted thereon. A shift shaft 118 of the transmission 100 extends through the side cover 114. The end of the shift shaft 118 which extends out of the housing 108 is splined so as to be operatively connected to the gear selector 102. When the operator of the ATV 10 moves the gear selector 102, the shift shaft 118 rotates. The front end of the output shaft 106 is disposed in an opening 120 at the front of the housing 108. The front end of the output shaft 106 is connected to an internally splined sleeve 122 used to operatively connect to the front driveshaft 58. The rear end of the output shaft 106 extends through the rear of the housing 108. The rear end of the output shaft 106 which extends out of the housing 108 is splined to operatively connect to the rear driveshaft 52. As can be seen, the output shaft 106 is disposed perpendicularly to the input shaft 104. It is contemplated that the output shaft 106 could alternatively be disposed parallel to the input shaft 104 to accommodate a drivetrain layout which is different from the one shown in FIG. 2.

Figure 5:
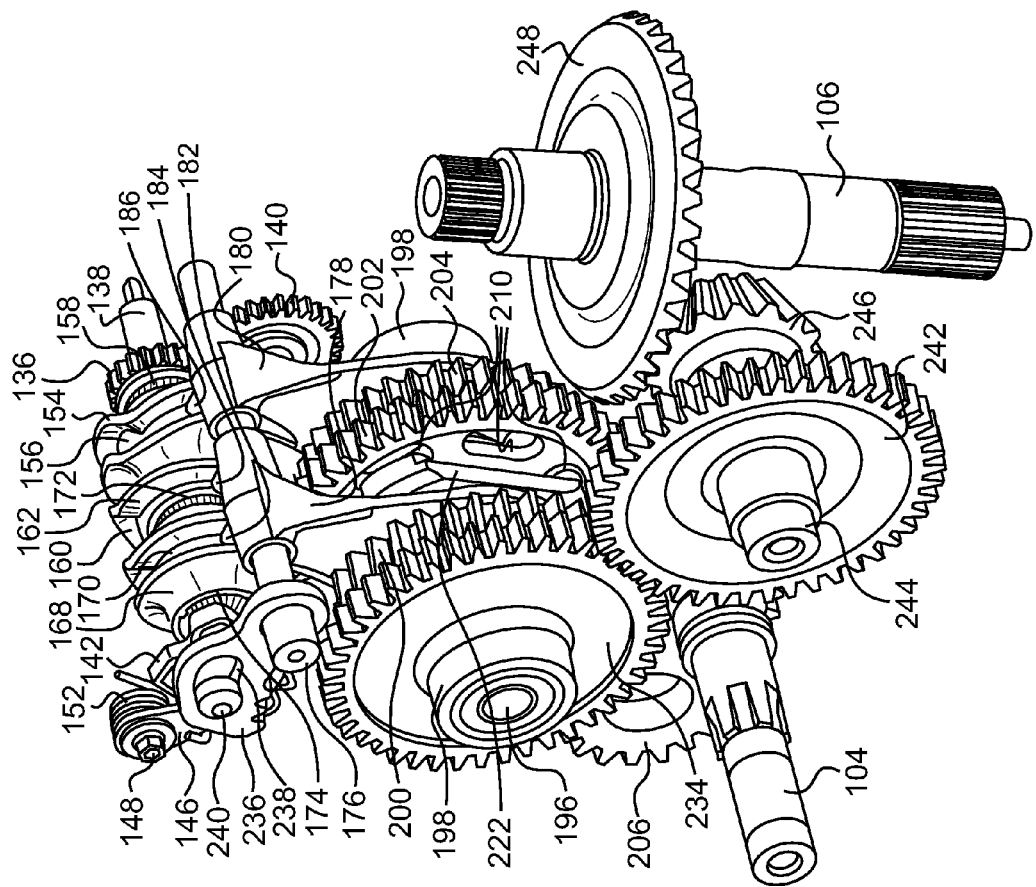
FIG. 5 is a perspective view taken from a bottom, rear, left side of internal components of the transmission of FIG. 3 with some elements of the transmission removed for clarity.
Figure 6:
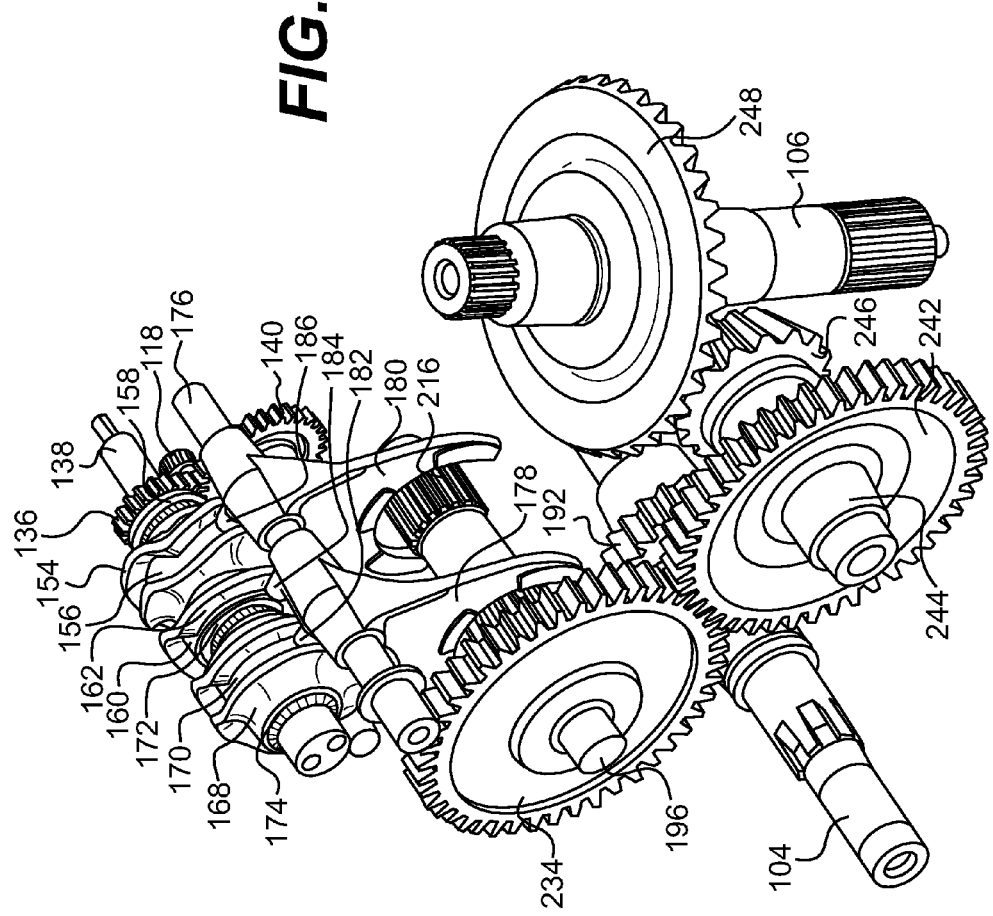
FIG. 6 is another perspective view taken from a bottom, rear, left side of the internal components of the transmission of FIG. 5 with additional elements of the transmission removed for clarity.
Figure 7:
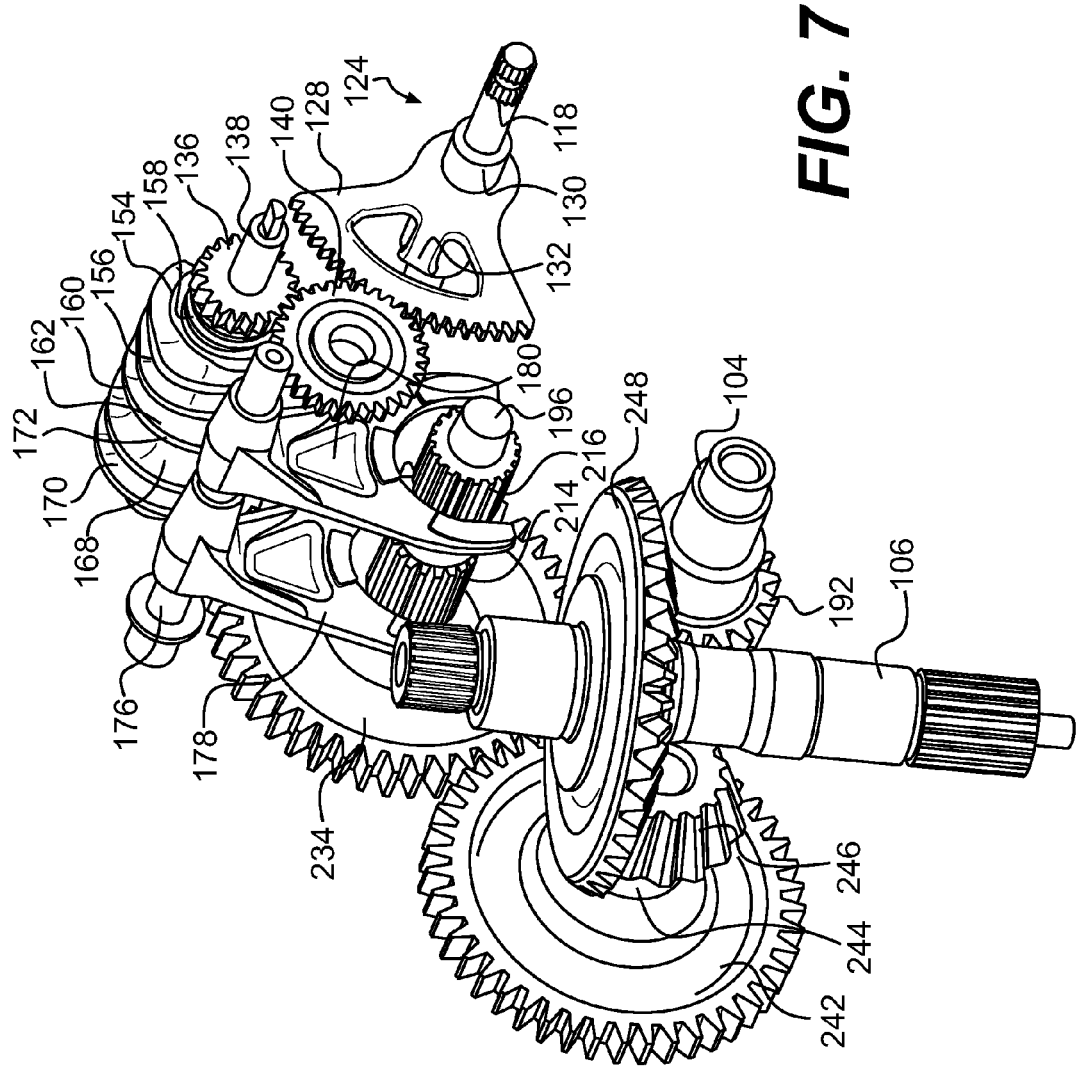
FIG. 7 is a is a perspective view taken from a bottom, rear, right side of the internal components of the transmission of FIG. 6.
Figure 8:
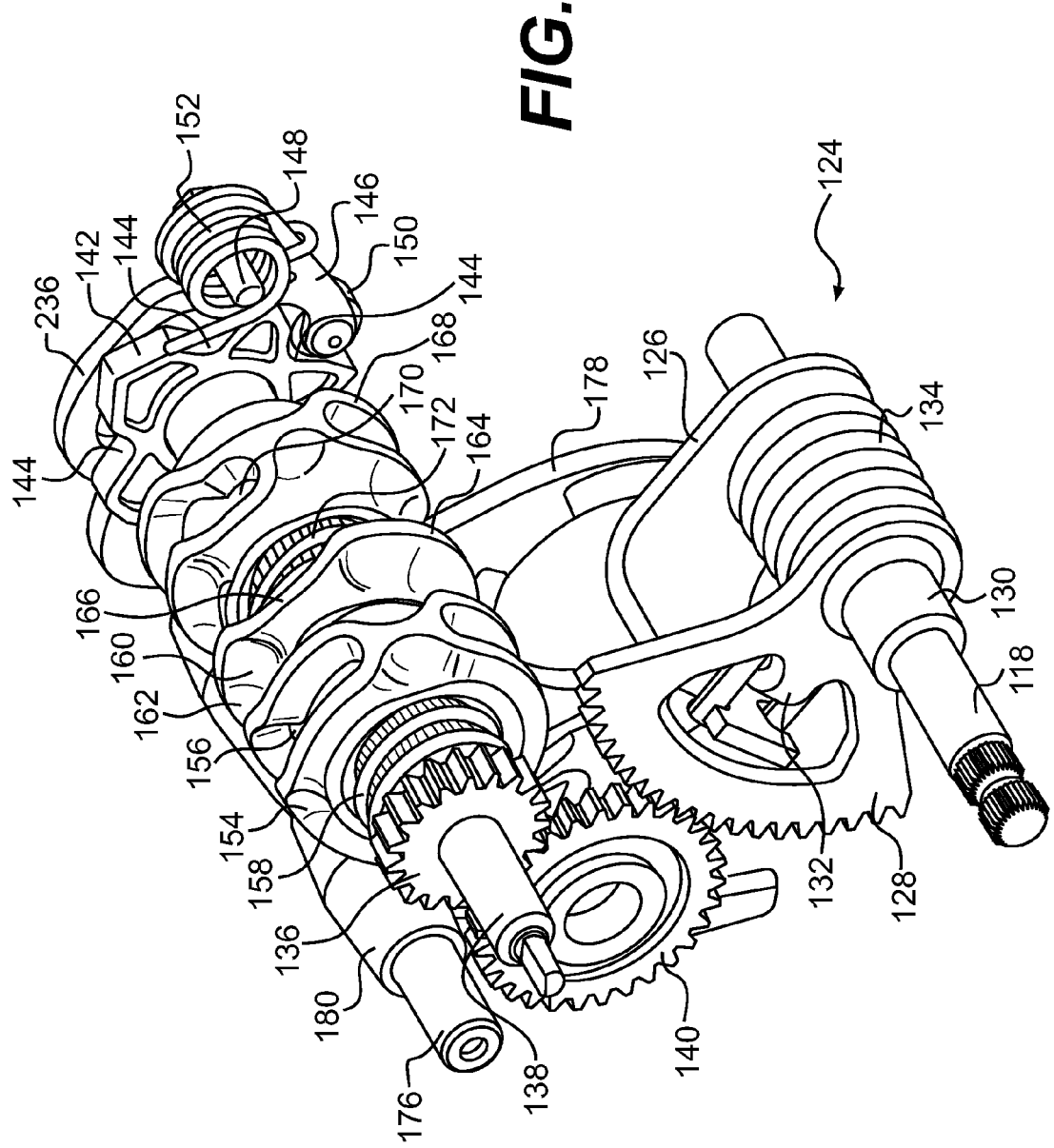
FIG. 8 is a is perspective view taken from a top, front, right side of a shifting mechanism of the transmission of FIG. 3.

Turning now to FIGS. 5 to 9A, the internal components of the transmission 100 will be described. As best seen in FIGS. 7 and 8, a shifting assembly 124 is mounted on the shift shaft 118. The shifting assembly 124 includes a lever 126 fixedly connected to the shift shaft 118 that rotates in unison therewith. The lever 126 has a first portion extending perpendicular to the shift shaft 118 and a second portion extending parallel to the shift shaft 118. The end of the second portion of the lever 126 includes a pair of recesses. A segment gear 128 having a sleeve portion 130 is rotatably mounted on the shift shaft 118. The segment gear 128 has a seat 132 projecting from an edge of an opening in the segment gear 128 and extending parallel to sleeve portion 130. The shifting assembly 124 also includes a torsion spring 134 installed onto the sleeve portion 130 of the segment gear 128. The extremities of the spring 134 are bent so as to be received in the pair of recesses of the lever 126 and to abut either sides of the seat 132 as shown. A more detailed description of a shifting assembly of the type of the shifting assembly 124 is provided in U.S. Pat. No. 7,617,904, issued Nov. 17, 2009, the entirety of which is incorporated herein by reference.

The rotational movement of the shifting shaft 118 imparted by the gear selector 102 is thus transferred to the segment gear 128 through the torsion spring 134. The segment gear 128 engages a drive gear 136 disposed on a shift drum shaft 138 via a gear 140 disposed on a shaft (not shown). As can be seen, the shift drum shaft 138 and the shift shaft 118 are parallel to each other. During operation of the ATV 10, it is possible that the gear 140 may be difficult to rotate due to difficulties in engaging the gears of the transmission as described below. When the operator wants to change shift position by moving the gear selector 102 and this occurs, the shift shaft 118 rotates and the energy received through the gear selector 102 is stored temporarily in the torsion spring 134 while the segment gear 128 remains stationary or rotates less than the shifting shaft 118 due to the difficult in rotating the gear 140. The energy stored in the torsion spring 134 is released when the situation which made engagement of the gears of the transmission 100 difficult to effect is eliminated. When the energy stored in the torsion spring 134 is released, the segment gear 128 rotates the gear 140, and thereby effects the desired change in shifting position.

Figure 14:
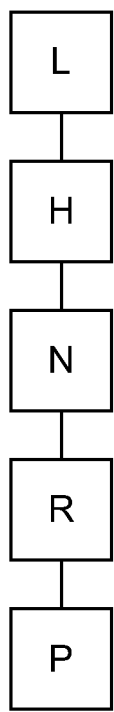
FIG. 14 is diagram illustrating a shifting sequence of the transmission of FIG. 3.

As best seen in FIG. 8, an indexing wheel 142 is connected to the shift drum shaft 138. The indexing wheel 142 rotates with the shift drum shaft 138. The indexing wheel 142 defines a plurality of recesses 144 each corresponding to a shifting position of the transmission 100. The vehicle transmission 100 has five shifting positions. As can be seen in FIG. 14, these positions are sequentially: park (P), reverse (R), neutral (N), high (H), and low (L). It is contemplated that the shifting sequence could be different. For example, the shifting sequence could be park, reverse, neutral, low, and high. Accordingly, the indexing wheel 142 has five recesses 144. It is contemplated that the vehicle transmission 100 could have more or less shifting positions, and as a result, the indexing wheel 142 would have a corresponding number of recesses 144. An indexing lever 146 is rotatably disposed on a shaft 148. A roller 150 is provided at one end of the indexing lever 146. A spring 152 biases the end of the indexing lever 146 having the roller 150 toward the indexing wheel 142 such that the roller 150 is in contact with the indexing wheel 142. The indexing wheel 142 and indexing lever 146 help ensure that the shift drum shaft 138 is in the angular position corresponding to the shifting position selected by the operator of the ATV 10 via the gear selector 102. The indexing wheel 142 and indexing lever 146 also provide some resistance to changes in shifting position, thus helping to prevent undesired changes in shifting position, and assist in selecting the desired shifting position once the shifting drum shaft 138 has been rotated by a certain amount (i.e. once the roller 150 passes over a tip of the indexing wheel 142).

As is also best seen in FIG. 8, a portion of the shift drum shaft 138 between the drive gear 136 and the indexing wheel 142 is splined. An internally splined shift drum 154 is disposed on the splined portion of the shift drum shaft 138. As such, the shift drum 154 is rotatably fixed to the shift drum shaft 138 and rotates therewith. The shift drum 154 can also move axially along the shift drum shaft 138 for reasons described below. The shift drum 154 defines a groove 156 shaped to effect the desired shifting sequence of the vehicle transmission 100 as described in greater detail below. A coil spring 158 is disposed around the shift drum shaft 138 between the drive gear 136 and the shift drum 154. It is contemplated that other types of springs could be used. The coil spring 158 biases the shift drum 154 away from the drive gear 136 into contact with a collar 160. This position of the shift drum 154 will be referred to herein as the default position of the shift drum 154.

The collar 160 is rotatably and axially fixed to the shift drum shaft 138. The collar 160 defines a radially extending wall 162 having a straight portion 164 and a recessed portion 166.

Figure 9A:
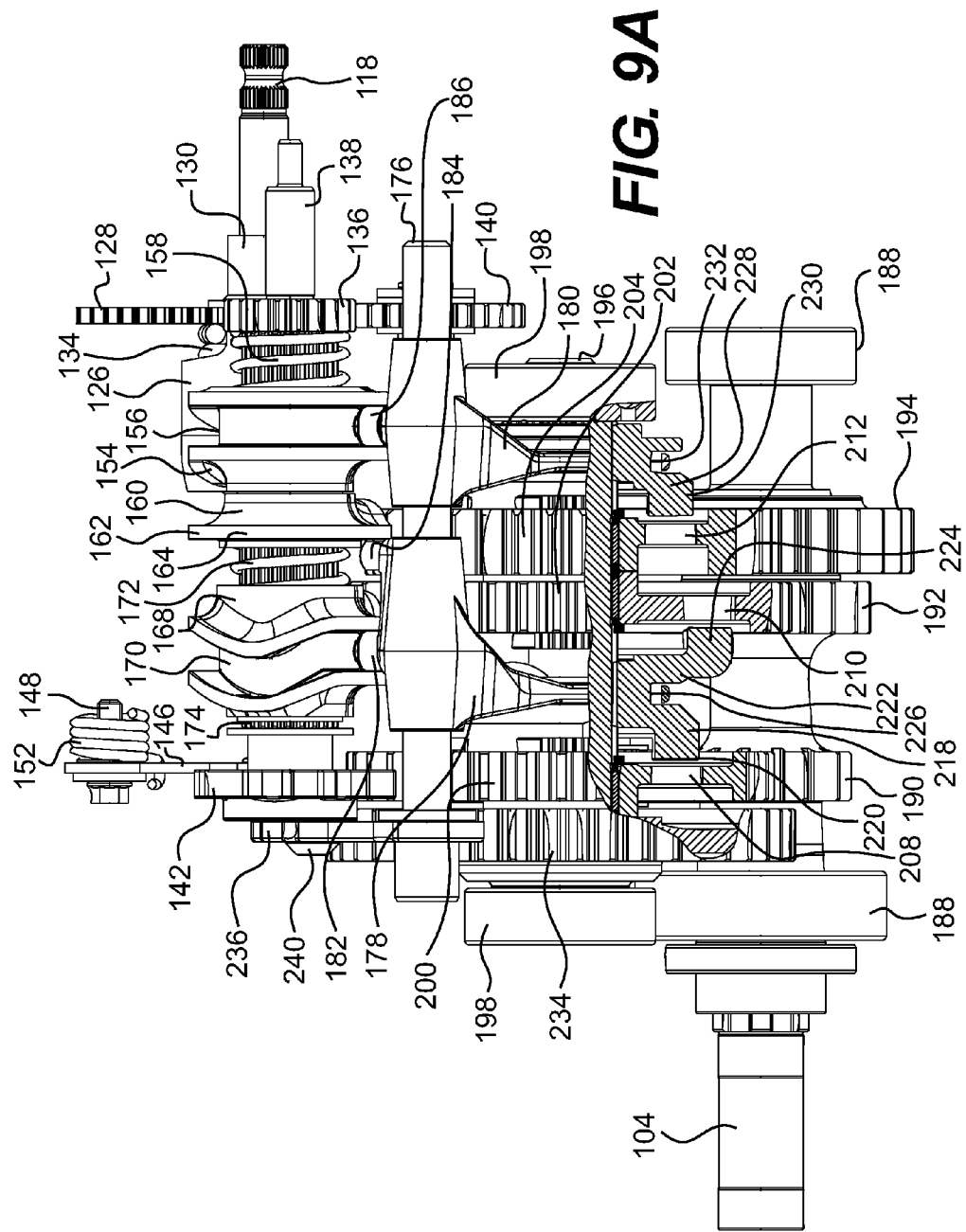
FIG. 9A is a rear perspective view of internal components of the transmission of FIG. 3 in a park position, with a portion thereof shown in cross-section.

Another internally splined shift drum 168 is disposed on the splined portion of the shift drum shaft 138 such that the collar 160 is disposed between the shift drums 154 and 168. As such, the shift drum 168 is rotatably fixed to the shift drum shaft 138 and rotates therewith. The shift drum 168 can also move axially along the shift drum shaft 138 for reasons described below. The shift drum 168 defines a groove 170 shaped to effect the desired shifting sequence of the vehicle transmission 100 as described in greater detail below. A coil spring 172 is disposed around the shift drum shaft 138 between the collar 160 and the shift drum 168. It is contemplated that the coil spring 172 could be disposed on the other side of the shift drum 168. It is also contemplated that other types of springs could be used. The coil spring 172 biases the shift drum 154 away from the collar 160 into contact with a stopper ring 174 (FIG. 9A). This position of the shift drum 168 will be referred to herein as the default position of the shift drum 168.

Turning now to FIGS. 5 to 7, a fork rod 176 is disposed parallel to the shift drum shaft 138. Two shift forks 178, 180 are slidably disposed on the fork rod 176. The shift fork 178 has a pin 182 received in the groove 170 of the shift drum 168 such that as the shift drum 168 rotates the pin 182 follows the groove 170 and causes the shift fork 178 to slide along the fork rod 176. The shift fork 178 has another pin 184 selectively abutting the radially extending wall 162 of the collar 160. The shift fork 180 has a pin 186 received in the groove 156 of the shift drum 154 such that as the shift drum 154 rotates the pin 186 follows the groove 156 and causes the shift fork 180 to slide along the fork rod 176.

Turning now to FIG. 9A, the input shaft 104 is rotatably supported inside the housing 108 by two bearings 188. The input shaft 104 is parallel to the fork rod 176. Three input gears 190, 192, 194 are connected to the input shaft 104 and rotate therewith. As can be seen the input gears 190, 192, 194 have different diameters, with input gear 190 having the smallest of the three diameters and input gear 194 having the largest of the three diameters. As can also be seen, the input gear 192 is disposed between the input gears 190 and 194, is spaced from the input gear 190 and is disposed next to the input gear 194.

As seen in FIG. 5, a transmission shaft 196 is rotatably supported inside the housing 108 by two bearings 198. The transmission shaft 196 is parallel to the input shaft 104. Three transmission gears 200, 202, 204 are rotatably connected to the transmission shaft 196 such that the transmission gears 200, 202, 204 can rotate independently of the transmission shaft 196. For example, in the park and neutral shifting positions described below, while the engine 40 is running and the input shaft 104 is therefore rotating, the transmission gears 200, 202, 204 rotate even though the transmission shaft 196 is not rotating. As can also be seen, the transmission gear 202 is disposed between the transmission gears 200 and 204, is spaced from the transmission gear 200 and is disposed next to the transmission gear 204. The transmission gear 202 engages and is driven by the input gear 192. The transmission gear 204 engages and is driven by the input gear 194. The transmission gear 200 engages and is driven by an idler gear 206. The idler gear 206 is disposed on a shaft (not shown) which is parallel to the input and transmission shafts 104, 196. The idler gear 206 engages and is driven by the input gear 190. Therefore, the transmission gear 200 rotates in a direction opposite a direction of rotation of the transmission gears 202, 204. A diameter of the transmission gear 202 is larger than the diameter of the transmission gear 204. Therefore the gear ratio of the gears 192 and 202 versus the gear ratio of the gears 194 and 204 is such that the speed of rotation of the transmission gear 204 is greater than the speed of rotation of the transmission gear 202. Referring to FIG. 9A, the transmission gear 200 has a set of openings 208, the transmission gear 202 has a set of openings 210, and the transmission gear 204 has a set of openings 212. The openings 208, 210, 212 are arranged in a circular pattern radially inwardly of an outer periphery of their respective transmission gears 200, 202, 204.

As best seen in FIG. 7, the transmission shaft 196 has splined portions 214, 216. The splined portion 214 is disposed between the transmission gears 200 and 202. The splined portion 216 is disposed next to the transmission gear 204. Turning now to FIG. 9A, a shifting sleeve 218 is disposed between the transmission gears 200 and 202. The shifting sleeve 218 engages the splined portion 214 so as to be rotatably fixed to the transmission shaft 196 and axially movable with respect to the transmission shaft 196. The shifting sleeve 218 has set of teeth 220 selectively engaging the set of openings 208 of the transmission gear 200. A shifting sleeve 222 is disposed between the shifting sleeve 218 and the transmission gear 202. The shifting sleeve 222 engages the splined portion 214 so as to be rotatably fixed to the transmission shaft 196 and axially movable with respect to the transmission shaft 196. The shifting sleeve 222 has set of teeth 224 for selectively engaging the set of openings 210 of the transmission gear 202. The shifting sleeves 218 and 222 are integrally formed, however it is contemplated that the shifting sleeves 218 and 222 could be separate parts. The shift fork 178 is received in a groove 226 formed between the shifting sleeves 218 and 222. A shifting sleeve 228 is disposed on the splined portion 216 such that the transmission gears 202, 204 are disposed between the shifting sleeve 222 and 228. The shifting sleeve 228 engages the splined portion 216 so as to be rotatably fixed to the transmission shaft 196 and axially movable with respect to the transmission shaft 196. The shifting sleeve 228 has set of teeth 230 for selectively engaging the set of openings 212 of the transmission gear 204. The shift fork 180 is received in a groove 232 formed in the shifting sleeve 228.

By sliding the shift forks 178, 180 along the fork rod 176, as described in greater detail below, the transmission gears 200, 202, 204 can be engaged by their corresponding shifting sleeves 218, 222, 228 respectively. Only one of the transmission gears 200, 202, 204 can be engaged at a time. When one of the transmission gears 200, 202, 204 is engaged by its corresponding shifting sleeve 218, 222, or 228, the rotational motion of the engaged transmission gear 200, 202 or 204 is transferred to the transmission shaft 196 by the corresponding shifting sleeve 218, 222, or 228 and the transmission shaft 196 rotates at the same speed and in the same direction as the engaged transmission gear 200, 202 or 204.

Figure 9B:
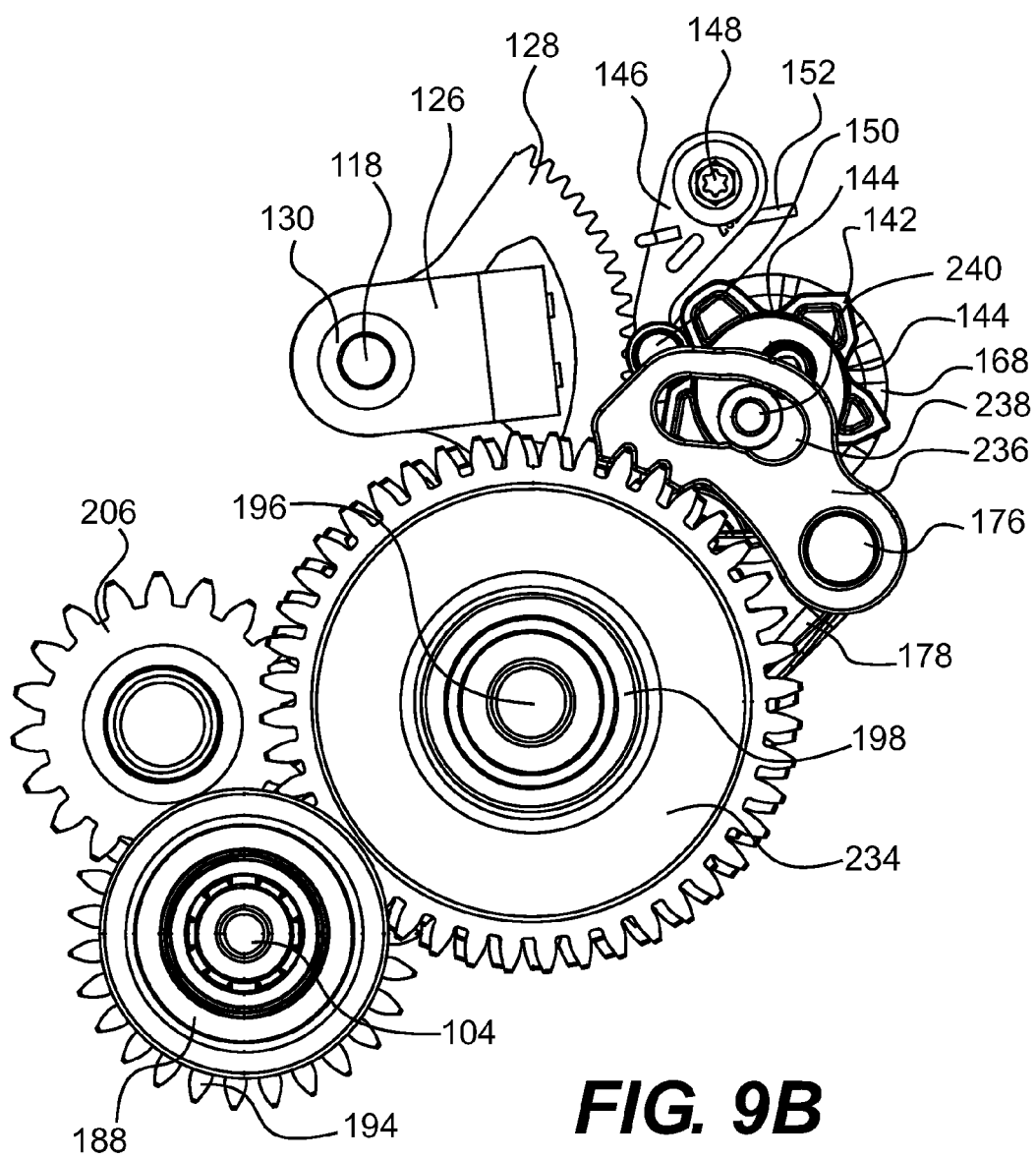
FIG. 9B is a left side elevation view of FIG. 9A.

As best seen in FIG. 5, another transmission gear 234 is fixedly connected to the transmission shaft 196 for rotation therewith. The transmission gear 234 is disposed between one of the bearings 198 and the transmission gear 200. The transmission gear 234 is selectively engaged by a parking lock lever 236. When the parking lock lever 236 engages the transmission gear 234 as shown in FIG. 9B, the transmission gear 234 and the transmission shaft 196 are prevented from rotating. The parking lock lever 236 is rotatably disposed on the fork rod 176. The parking lock lever 236 has an opening 238 defined therein. An eccentric 240 is connected to an end of the shift drum shaft 138. The eccentric 240 is received inside the opening 238 of the parking lock lever 236. As the shift drum shaft 138 is rotated, the eccentric 240 moves the parking lock lever 236 from the position where the parking lock lever 236 engages the transmission gear 234 to a plurality of positions where the parking lock lever 236 is disengaged from the transmission gear 234.

As seen in FIGS. 5 to 7, the transmission gear 234 engages an intermediate gear 242 connected to an intermediate shaft 244 and rotating therewith. The intermediate shaft 244 is parallel to the input shaft 104. A bevel gear 246 is connected to the intermediate shaft 244 and rotates therewith. The bevel gear 246 engages a bevel gear 248 connected to the output shaft 106 and rotating therewith. When the transmission shaft 196 rotates, the transmission gear 234 drives the intermediate gear 242 which causes the bevel gear 246 to drive the bevel gear 248, and therefore the output shaft 106. It is contemplated that the output shaft 106 could be disposed parallel to the intermediate shaft 244 by replacing the bevel gears 246, 248 by spur gears. It is also contemplated that the intermediate shaft 244 and gears 242 and 246 could be omitted and that the output shaft 106 could be driven directly from the transmission shaft 196. In such an embodiment the transmission gear 234 would be replaced by a bevel gear to engage the bevel gear 248. Alternatively, the output shaft 106 could be oriented parallel to the transmission shaft 196 and the bevel gear 248 would be replaced by a spur gear to engage the transmission gear 234. It is also contemplated that other types of gearing arrangements could be used to drive the output shaft 106 from the transmission shaft 196.

Turning now to FIGS. 9A to 14, the arrangement of the internal components of the vehicle transmission 100 in the various shift positions of the shifting sequence and the transition from one shifting position to the other will be described.

As explained above, and as shown in FIG. 14, the vehicle transmission 100 has five shifting positions. These positions are sequentially: park (P), reverse (R), neutral (N), high (H), and low (L). The sequence can be followed in one direction or the other (i.e. P-R-N-H-L or L-H-N-R-P). Although each of the shifting positions must be selected in sequence by the gear selector 102, there is no need to go through the complete shifting sequence before returning to prior shifting positions in the sequence. For example, the operator of the ATV 10 could move the gear selector 102 to select various shifting positions in the following orders: P-R-N-H-N-R or L-H-L-H-N-R or P-R-P. As should be appreciated, many more sequences are possible.

Turning now to FIGS. 9A and 9B, a park shifting position of the vehicle transmission 100 will be described. When the park shifting position is selected by the gear selector 102, the shift shaft 118 and segment gear 128 are rotated to the position shown, which in turn rotates the shift drum shaft 138 to its park position and rotates the shift drums 154, 168 with the shift drum shaft 138. The indexing wheel 142 and the indexing lever 146 ensure that the shift drum shaft 138 and the shift drums 154, 168 are in the correct angular orientation for the park position. The shift drums 154, 168 are in their default positions. In the park position, the groove 156 of the shift drums 154 positions the pin 186 such that the shift fork 180 maintains the shifting sleeve 228 in a position where the set of teeth 230 of the shifting sleeve 228 are disengaged from the set of openings 212 of the transmission gear 204. In the park position, the groove 170 of the shift drum 168 positions the pin 182 such that the shift fork 178 moves the shifting sleeve 218 to a position where the set of teeth 220 of the shifting sleeve 218 are disengaged from the set of openings 208 of the transmission gear 200 and moves the shifting sleeve 222 to a position where the set of teeth 224 of the shifting sleeve 222 are disengaged from the set of openings 210 of the transmission gear 202. Also, the groove 170 of the shift drums 168 positions the pin 182 such that the pin 184 of the shift fork 178 is disposed adjacent to the straight portion 164 of the radially extending wall 162 of the collar 160. Since the pin 184 is disposed adjacent to the radially extending wall 162 and the shift drum 168 contacts the stopper ring 174, the shift fork 178 is prevented from sliding along the fork rod 176. Since none of the transmission gears 200, 202, 204 are engaged, the transmission shaft 196 does not rotate even though the input shaft 104 may be rotating. In the park position of the shift drum shaft 138, the parking lock lever 236 engages the transmission gear 234 as shown in FIG. 9B, thus preventing the transmission shaft 196 and therefore the output shaft 106 and the wheels 14 (and wheels 12 should the all-wheel drive mode be selected) from rotating. The parking lock lever 236 by engaging the transmission gear 234 therefore prevents the ATV 10 from moving when, for example, it is parked on a hill.

Figure 10A:
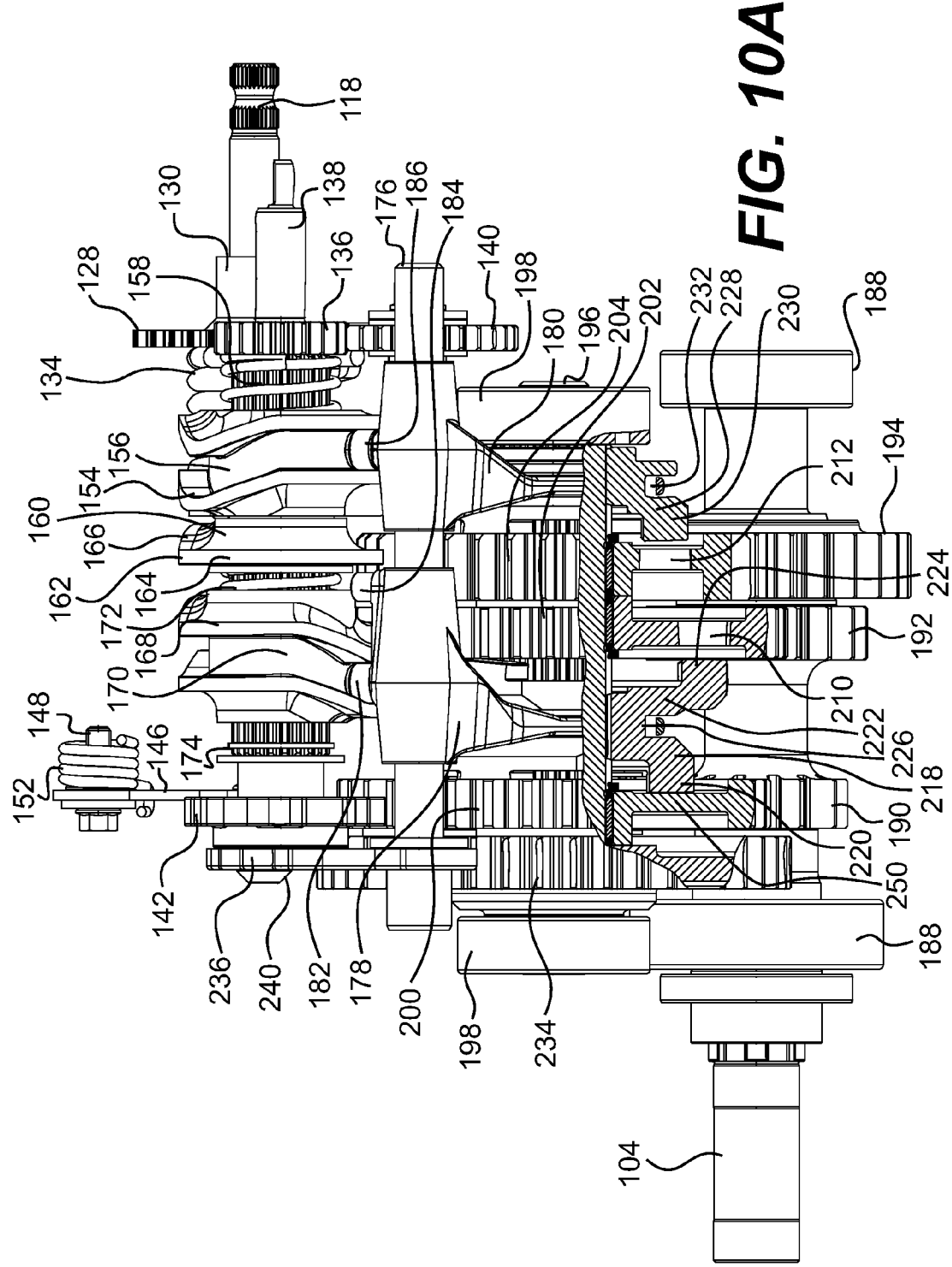
FIG. 10A is a rear perspective view of internal components of the transmission of FIG. 3 in a reverse pre-select position, with a portion thereof shown in cross-section.
Figure 10B:
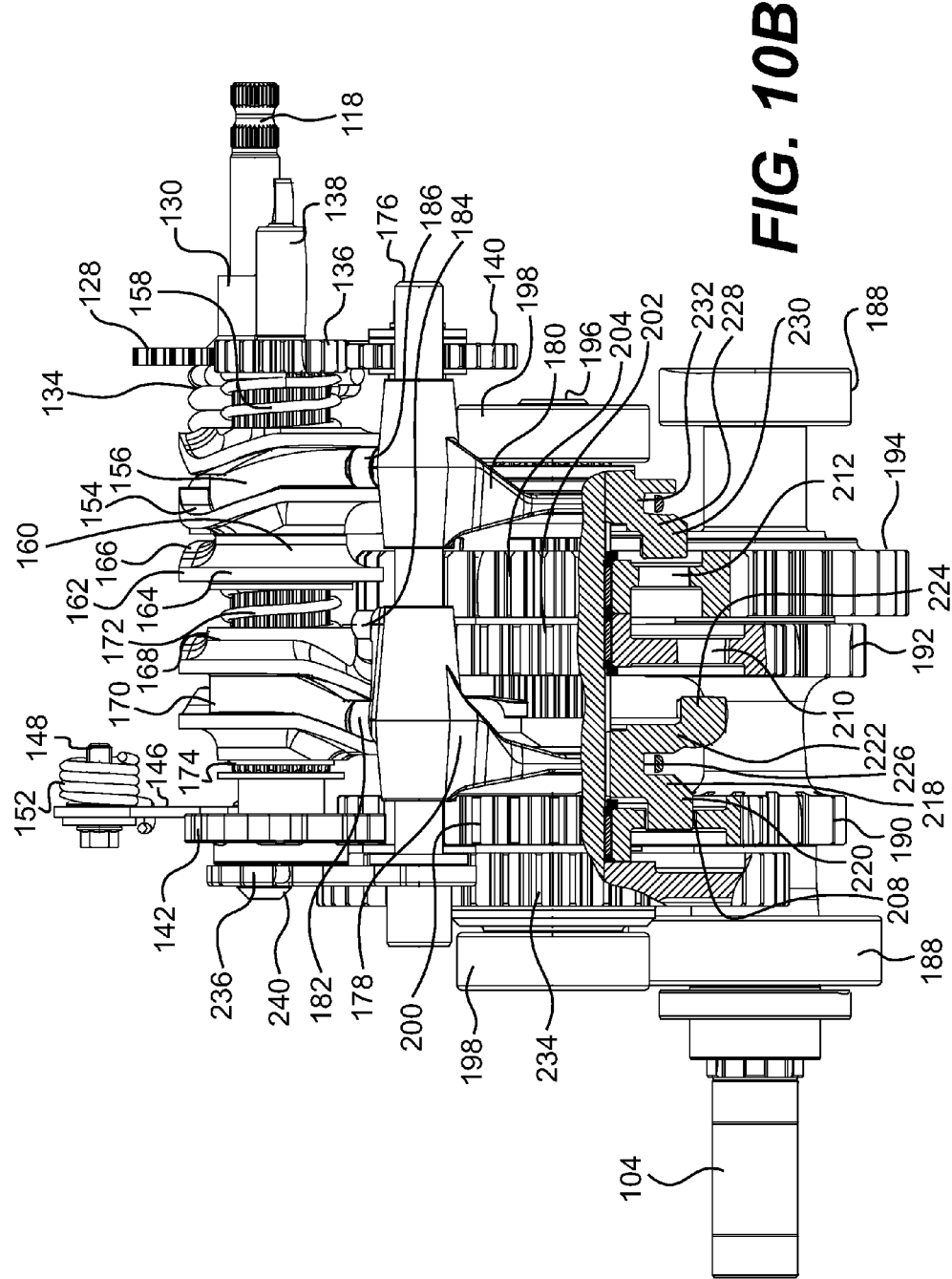
FIG. 10B is a rear perspective view of internal components of the transmission of FIG. 3 in a reverse position, with a portion thereof shown in cross-section.
Figure 10C:
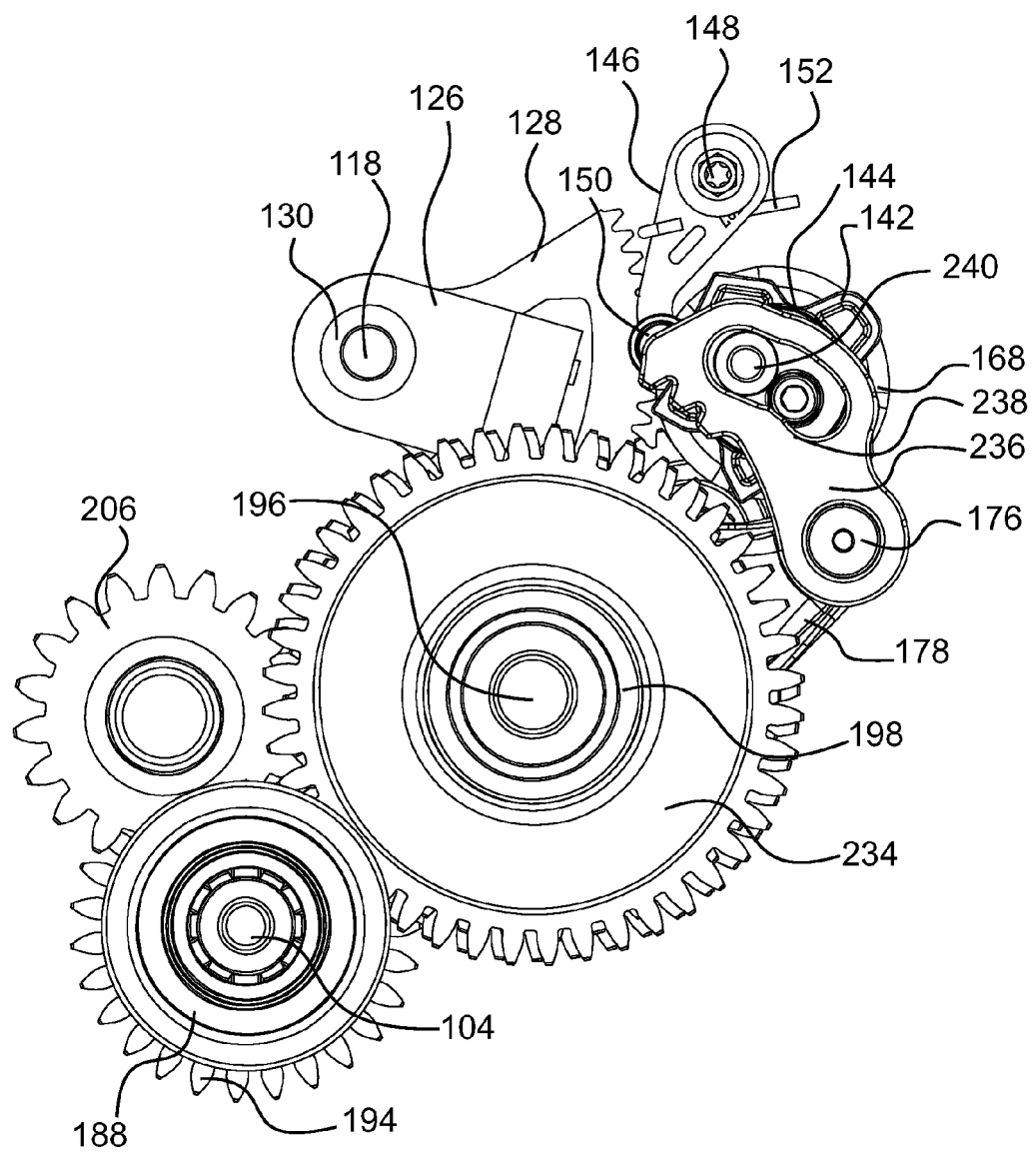
FIG. 10C is a left side elevation view of FIG. 10B.

Turning now to FIGS. 10A to 10C, a reverse shifting position of the vehicle transmission 100 will be described. When the reverse shifting position is selected by the gear selector 102, the shift shaft 118 and segment gear 128 are rotated to the position shown, which in turn rotates the shift drum shaft 138 to its reverse position and rotates the shift drums 154, 168 with the shift drum shaft 138. The indexing wheel 142 and the indexing lever 146 ensure that the shift drum shaft 138 and the shift drums 154, 168 are in the correct angular orientation for the reverse position. The shift drum 154 is in its default position. In the reverse position, the groove 156 of the shift drums 154 positions the pin 186 such that the shift fork 180 maintains the shifting sleeve 228 in a position where the set of teeth 230 of the shifting sleeve 228 are disengaged from the set of openings 212 of the transmission gear 204. In the reverse position, the groove 170 of the shift drums 168 positions the pin 182 such that the shift fork 178 moves the shifting sleeve 218 toward a position where the set of teeth 220 of the shifting sleeve 218 are to be engaged with the set of openings 208 of the transmission gear 200 and moves the shifting sleeve 222 to a position where the set of teeth 224 of the shifting sleeve 222 are disengaged from the set of openings 210 of the transmission gear 202. There is a possibility that the set of teeth 220 of the shifting sleeve 218 are misaligned with the set of openings 208 of the transmission gear 200 and as such cannot engage them. In the event that this occurs, the set of teeth 220 of the shifting sleeve 218 come into contact with portions 250 of the transmission gear 200 located between the openings 208 as shown in FIG. 10A. As also shown in FIG. 10A, as a result of the teeth 220 coming into contact with the portions 250, the shift drum 168 moves on the shift drum shaft 138 toward the collar 160, thereby compressing the spring 172. This position of the shift drum 168 will be referred to herein as the pre-select position of the shift drum 168. As the transmission gear 200 continues to rotate, the teeth 220 of the shifting sleeve 218 are eventually aligned with the openings 208 of the transmission gear 200 and the spring 172 biases the shift drum 168 back to its default position, which also moves the shift fork 178 and shifting sleeve 218 toward the transmission gear 200 such that the teeth 220 of the shifting sleeve 218 engage the openings 208 of the transmission gear 200 as shown in FIG. 10B. Should the teeth 220 of the shifting sleeve 218 be aligned with the openings 208 of the transmission gear 200 when the gear selector 102 and shift drum shaft 138 are moved to their reverse positions, the shift drum 168 remains in its default position and the teeth 220 of the shifting sleeve 218 are engaged with the openings 208 of the transmission gear 200 as shown in FIG. 10B. In the reverse position of the shift drum shaft 138, the parking lock lever 236 is disengaged from the transmission gear 234 as shown in FIG. 10C. Once the teeth 220 of the shifting sleeve 218 are engaged with the openings 208 of the transmission gear 200, the rotational motion of the transmission gear 200 is transferred to the transmission shaft 196 and, as described above, to the output shaft 106, the wheels 14, and, should the all-wheel drive mode be selected, the wheels 12. When the reverse shifting position is selected, the ATV 10 moves rearwardly.

By having the shift drum 168 move to its pre-select position, the shift drum shaft 138 and the gear selector 102 can be moved to their positions corresponding to the reverse shifting position of the vehicle transmission 100 even though the transmission gear 200 has not been engaged by the shifting sleeve 218, compared with at least some prior art transmissions where the shifting drum shaft and gear selector cannot be moved to their reverse shifting positions until the corresponding transmission gear is engaged by its corresponding shifting sleeve. Having the shift drum 168 move to the pre-select position also permits the gear selector 102 and the shifting drum shaft 138, along with the other internal components of the vehicle transmission 100, to be moved to the next position in the shifting sequence (i.e. park or neutral) even if the transmission gear 200 has not yet been engaged by the shifting sleeve 218.

Figure 11A:
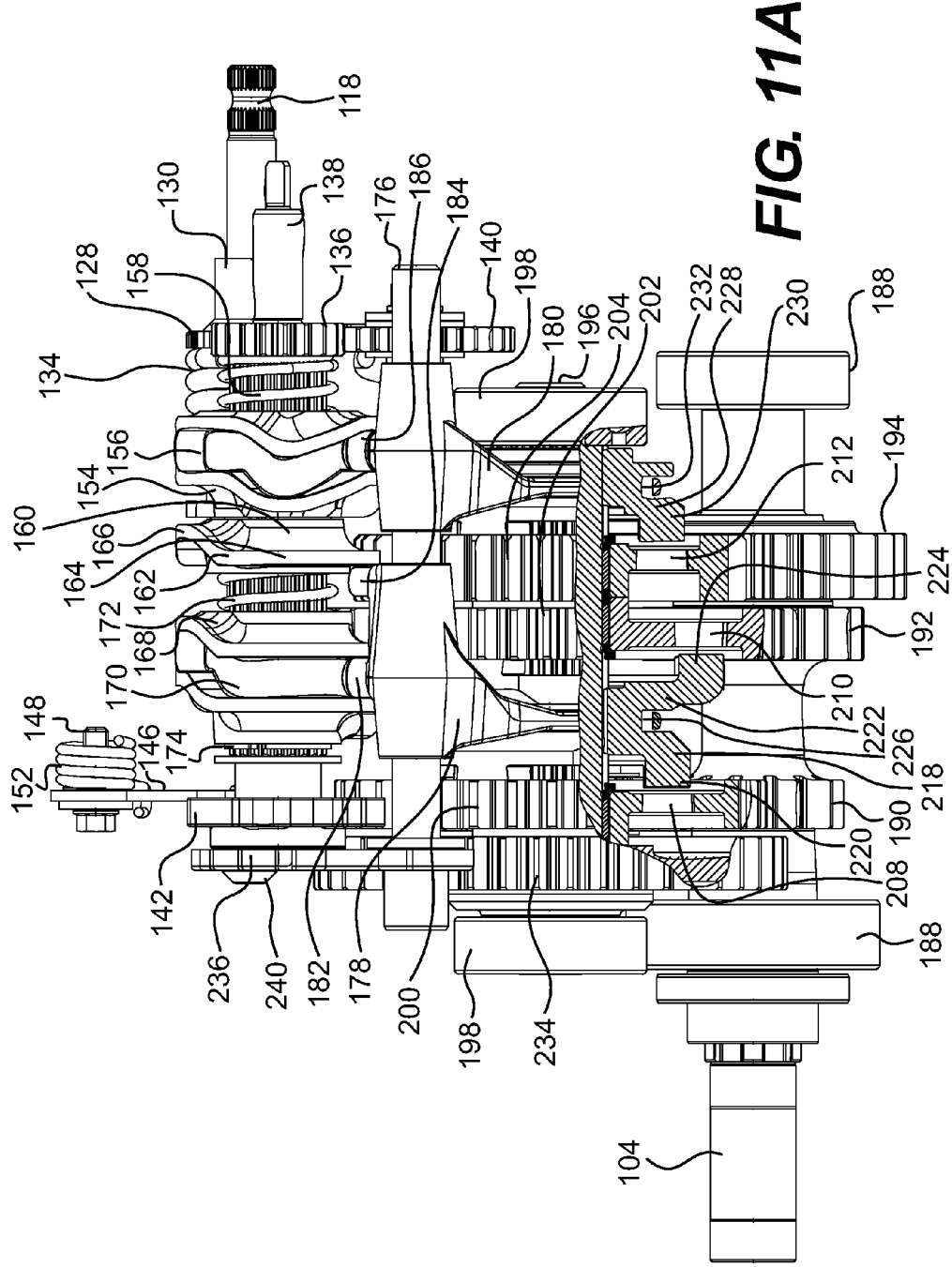
FIG. 11A is a rear perspective view of internal components of the transmission of FIG. 3 in a neutral position, with a portion thereof shown in cross-section.
Figure 11B:
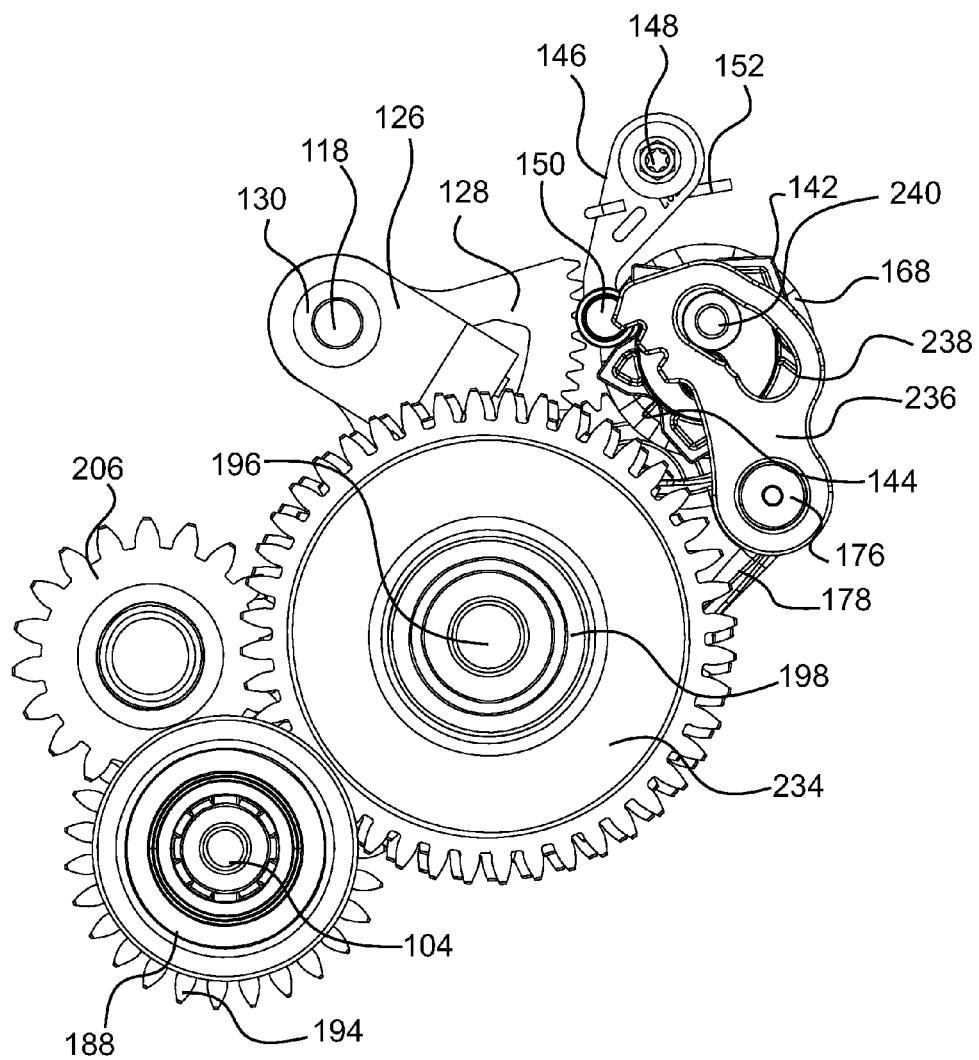
FIG. 11B is a left side elevation view of FIG. 11A.

Turning now to FIGS. 11A and 11B, a neutral shifting position of the vehicle transmission 100 will be described. When the neutral shifting position is selected by the gear selector 102, the shift shaft 118 and segment gear 128 are rotated to the position shown, which in turn rotates the shift drum shaft 138 to its neutral position and rotates the shift drums 154, 168 with the shift drum shaft 138. The indexing wheel 142 and the indexing lever 146 ensure that the shift drum shaft 138 and the shift drums 154, 168 are in the correct angular orientation for the neutral position. The shift drums 154, 168 are in their default positions. In the neutral position, the groove 156 of the shift drums 154 positions the pin 186 such that the shift fork 180 moves the shifting sleeve 228 to a position where the set of teeth 230 of the shifting sleeve 228 are disengaged from the set of openings 212 of the transmission gear 204. In the neutral position, the groove 170 of the shift drums 168 positions the pin 182 such that the shift fork 178 moves the shifting sleeve 218 to a position where the set of teeth 220 of the shifting sleeve 218 are disengaged from the set of openings 208 of the transmission gear 200 and moves the shifting sleeve 222 to a position where the set of teeth 224 of the shifting sleeve 222 are disengaged from the set of openings 210 of the transmission gear 202. Also, the groove 170 of the shift drums 168 positions the pin 182 such that the pin 184 of the shift fork 178 is disposed adjacent to the straight portion 164 of the radially extending wall 162 of the collar 160. Since the pin 184 is disposed adjacent to the radially extending wall 162 and the shift drum 168 contacts the stopper ring 174, the shift fork 178 is prevented from sliding along the fork rod 176. Since none of the transmission gears 200, 202, 204 are engaged, the transmission shaft 196 does not rotate even though the input shaft 104 is rotating. In the neutral position of the shift drum shaft 138, the parking lock lever 236 is disengaged from the transmission gear 234 as shown if FIG. 11B.

Figure 12A:
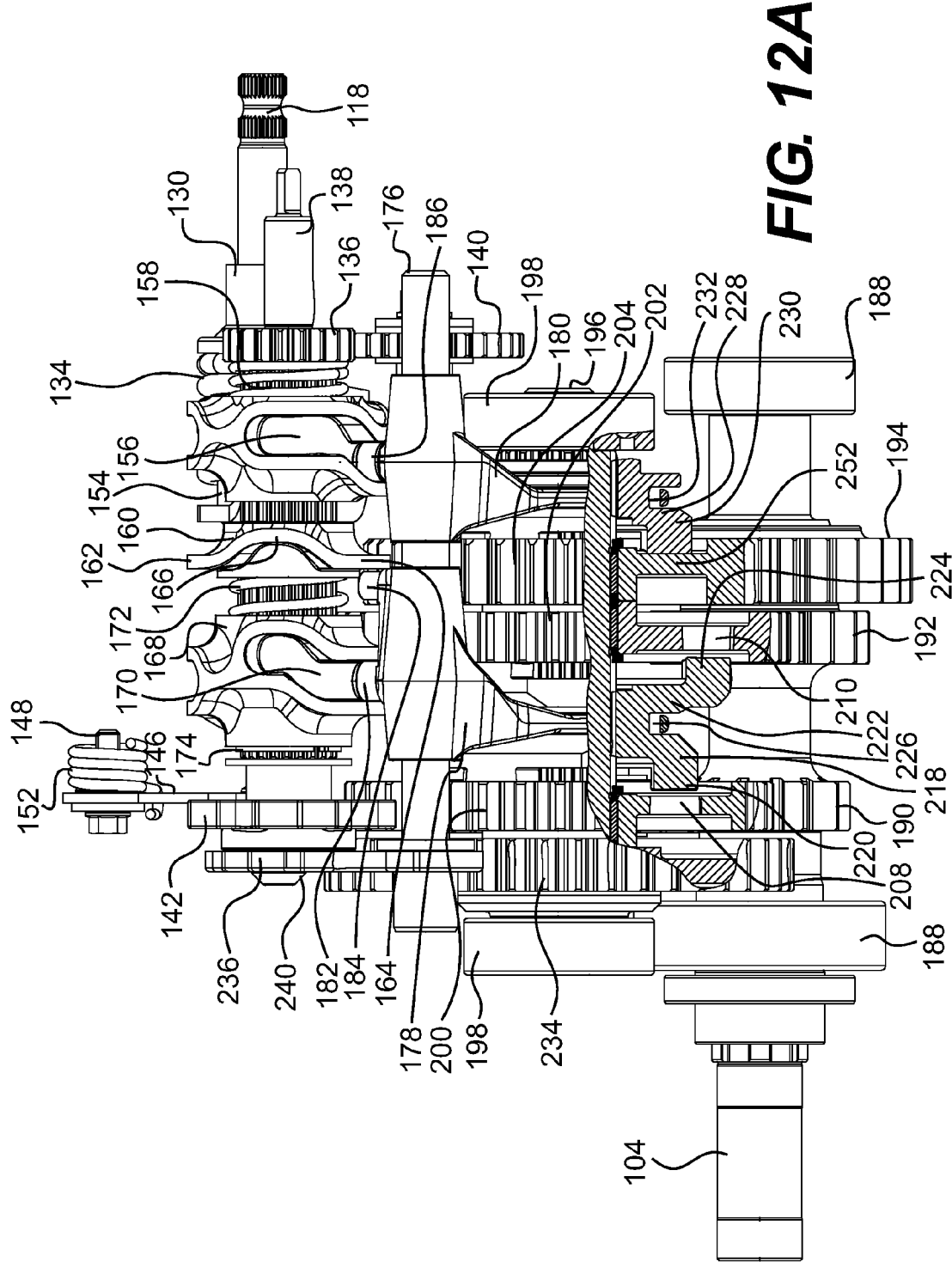
FIG. 12A is a rear perspective view of internal components of the transmission of FIG. 3 in a high pre-select position, with a portion thereof shown in cross-section.
Figure 12B:
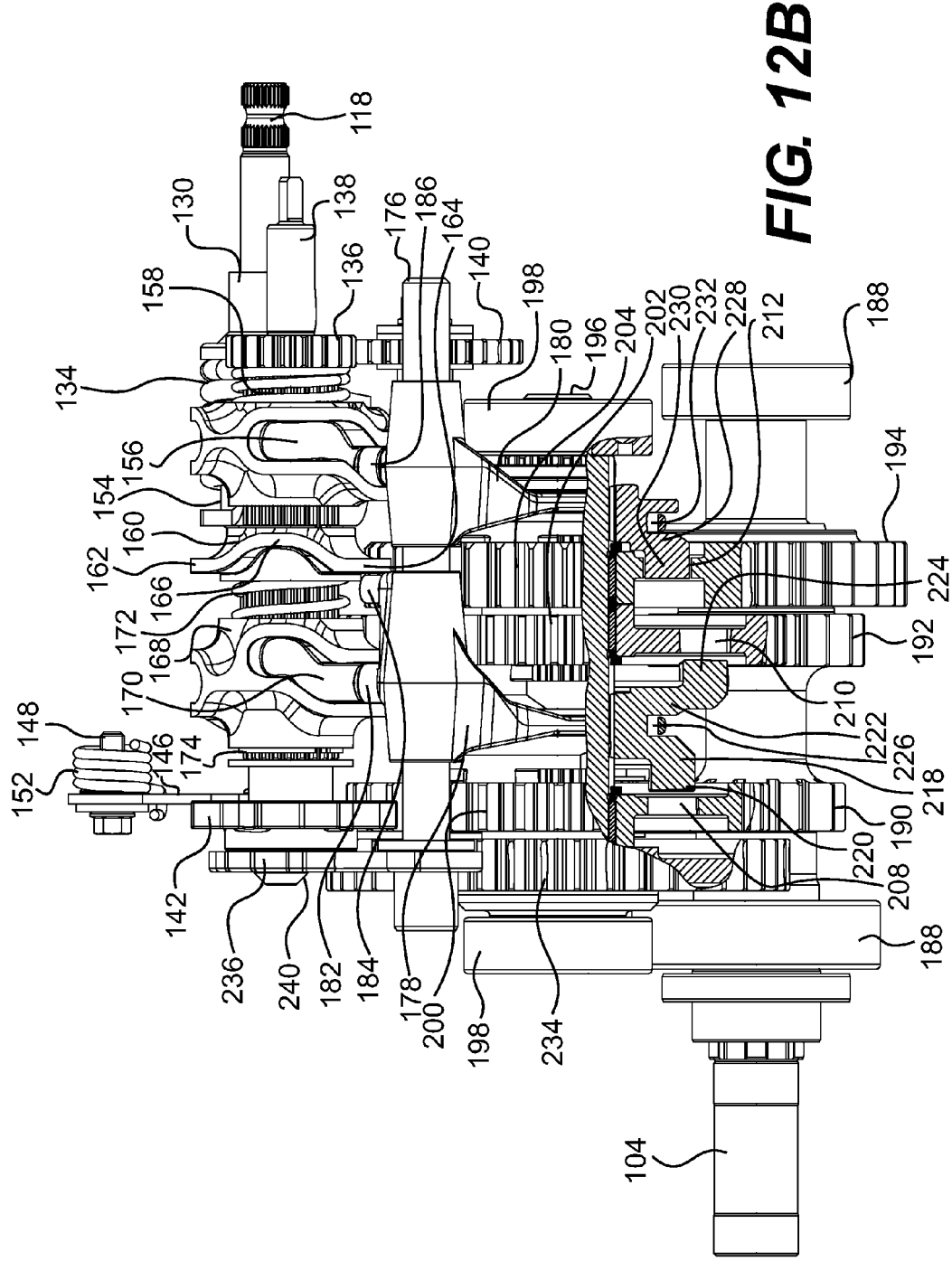
FIG. 12B is a rear perspective view of internal components of the transmission of FIG. 3 in a high position, with a portion thereof shown in cross-section.
Figure 12C:
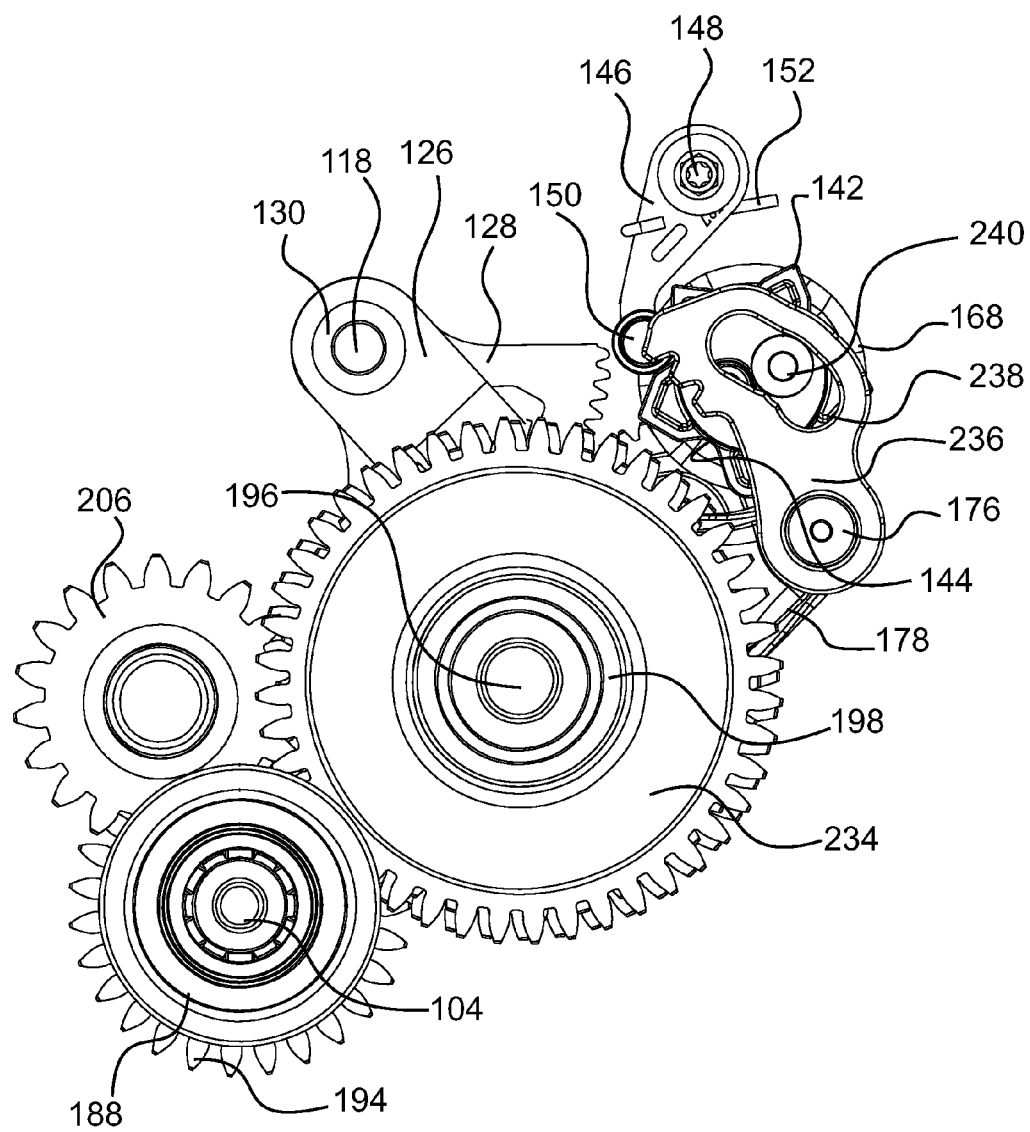
FIG. 12C is a left side elevation view of FIG. 12B.

Turning now to FIGS. 12A to 12C, a high shifting position of the vehicle transmission 100 will be described. When the high shifting position is selected by the gear selector 102, the shift shaft 118 and segment gear 128 are rotated to the position shown, which in turn rotates the shift drum shaft 138 to its high position and rotates the shift drums 154, 168 with the shift drum shaft 138. The indexing wheel 142 and the indexing lever 146 ensure that the shift drum shaft 138 and the shift drums 154, 168 are in the correct angular orientation for the high position. The shift drum 168 is in its default position. In the high position, the groove 170 of the shift drums 168 positions the pin 182 such that the shift fork 178 moves the shifting sleeve 218 to a position where the set of teeth 220 of the shifting sleeve 218 are disengaged from the set of openings 208 of the transmission gear 200 and moves the shifting sleeve 222 to a position where the set of teeth 224 of the shifting sleeve 222 are disengaged from the set of openings 210 of the transmission gear 202. Also, the groove 170 of the shift drums 168 positions the pin 182 such that the pin 184 of the shift fork 178 is disposed adjacent to the straight portion 164 of the radially extending wall 162 of the collar 160. Since the pin 184 is disposed adjacent to the radially extending wall 162 and the shift drum 168 contacts the stopper ring 174, the shift fork 178 is prevented from sliding along the fork rod 176. In the high position, the groove 156 of the shift drums 154 positions the pin 186 such that the shift fork 180 moves the shifting sleeve 228 toward a position where the set of teeth 230 of the shifting sleeve 228 are to be engaged with the set of openings 212 of the transmission gear 204. There is a possibility that the set of teeth 230 of the shifting sleeve 228 are misaligned with the set of openings 212 of the transmission gear 204 and as such cannot engage them. In the event that this occurs, the set of teeth 230 of the shifting sleeve 228 come into contact with portions 252 of the transmission gear 204 located between the openings 212 as shown in FIG. 12A. As also shown in FIG. 12A, as a result of the teeth 230 coming into contact with the portions 252, the shift drum 154 moves on the shift drum shaft 138 toward the drive gear 136, thereby compressing the spring 158. This position of the shift drum 154 will be referred to herein as the pre-select position of the shift drum 154. As the transmission gear 204 continues to rotate, the teeth 230 of the shifting sleeve 228 are eventually aligned with the openings 212 of the transmission gear 204 and the spring 158 biases the shift drum 154 back to its default position, which also moves the shift fork 180 and shifting sleeve 228 toward the transmission gear 204 such that the teeth 230 of the shifting sleeve 228 engage the openings 212 of the transmission gear 204 as shown in FIG. 12B. Should the teeth 230 of the shifting sleeve 228 be aligned with the openings 212 of the transmission gear 204 when the gear selector 102 and shift drum shaft 138 are moved to their high positions, the shift drum 154 remains in its default position and the teeth 230 of the shifting sleeve 228 are engaged with the openings 212 of the transmission gear 204 as shown in FIG. 12B. In the high position of the shift drum shaft 138, the parking lock lever 236 is disengaged from the transmission gear 234 as shown in FIG. 12C. Once the teeth 230 of the shifting sleeve 228 are engaged with the openings 212 of the transmission gear 204, the rotational motion of the transmission gear 204 is transferred to the transmission shaft 196 and, as described above, to the output shaft 106, the wheels 14, and, should the all-wheel drive mode be selected, the wheels 12. When the high shifting position is selected, the ATV 10 moves forwardly.

By having the shift drum 154 move to its pre-select position, the shift drum shaft 138 and the gear selector 102 can be moved to their positions corresponding to the high shifting position of the vehicle transmission 100 even though the transmission gear 204 has not been engaged by the shifting sleeve 228, compared with at least some prior art transmissions where the shifting drum shaft and gear selector cannot be moved to their high shifting positions until the corresponding transmission gear is engaged by its corresponding shifting sleeve. Having the shift drum 154 move to the pre-select position also permits the gear selector 102 and the shifting drum shaft 138, along with the other internal components of the vehicle transmission 100, to be moved to the next position in the shifting sequence (i.e. neutral or low) even if the transmission gear 204 has not yet been engaged by the shifting sleeve 228.

Figure 13A:
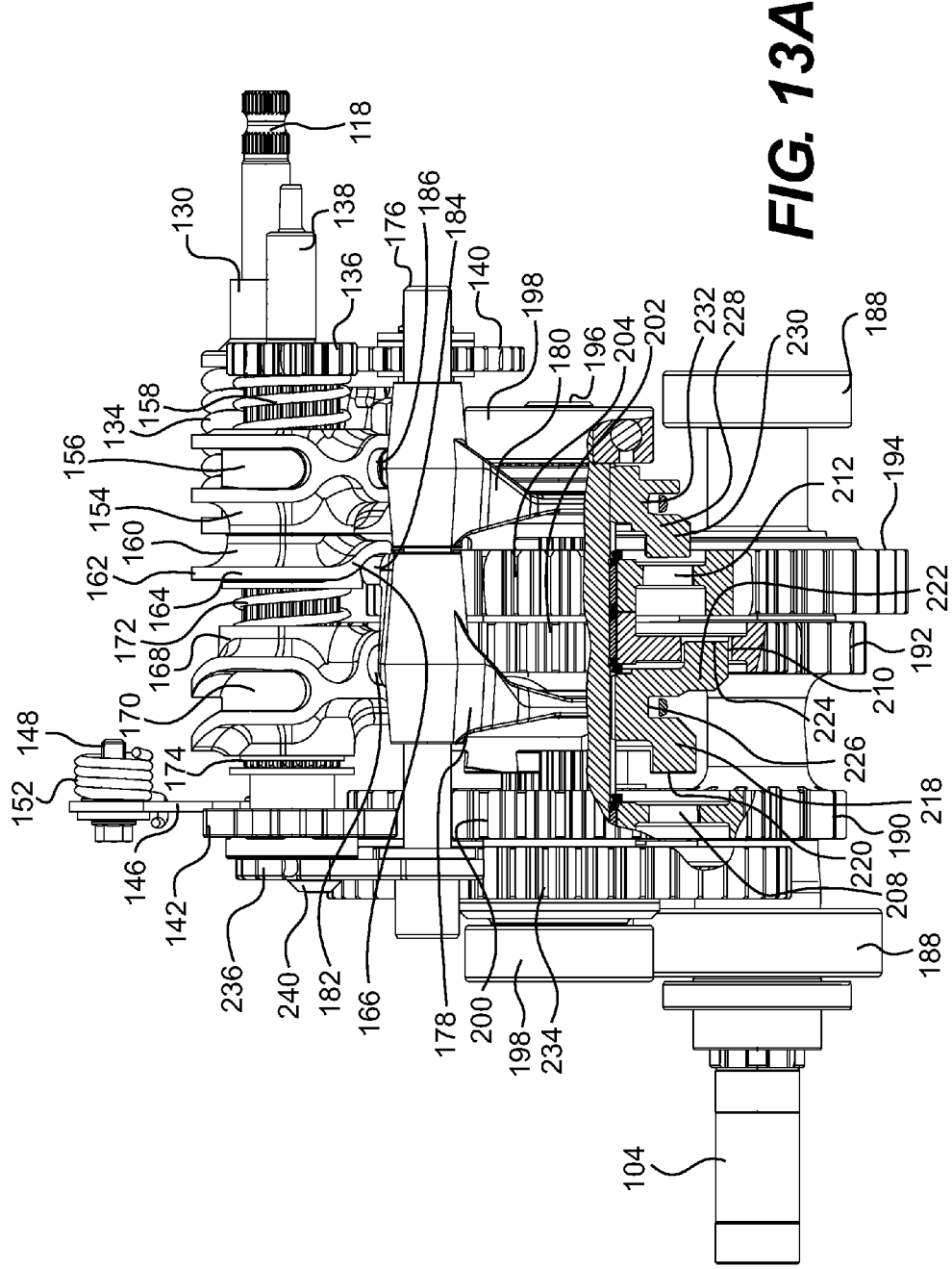
FIG. 13A is a rear perspective view of internal components of the transmission of FIG. 3 in a low position, with a portion thereof shown in cross-section.
Figure 13B:
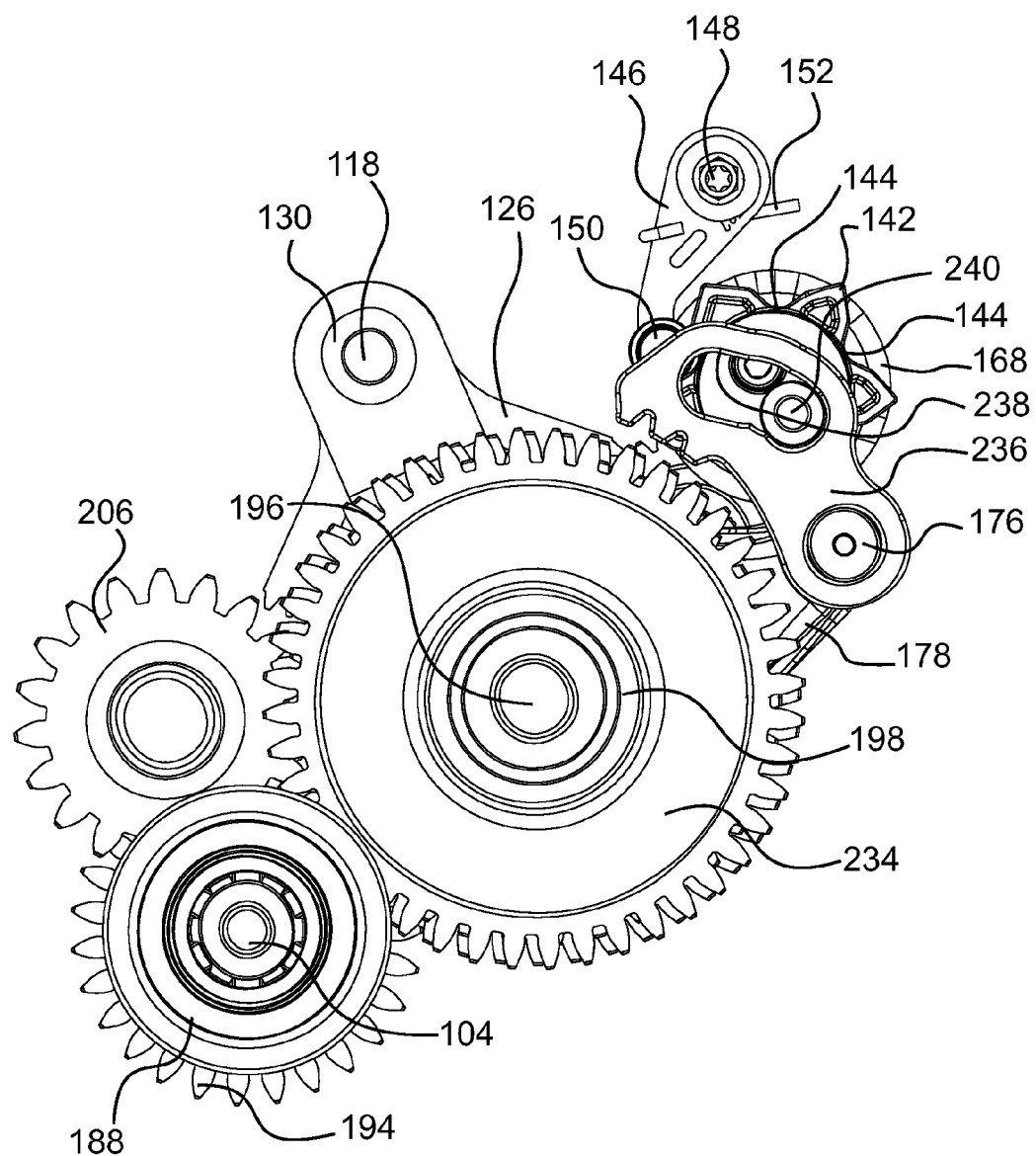
FIG. 13B is a left side elevation view of FIG. 13A.

Turning now to FIGS. 13A and 13B, a low shifting position of the vehicle transmission 100 will be described. When the low shifting position is selected by the gear selector 102, the shift shaft 118 is rotated. As the shifting drum shaft 138 is being rotated to its low position by the segment gear 128, the shift drum 168 is in its default position, and the groove 170 of the shift drums 168 positions the pin 182 such that the shift fork 178 moves the shifting sleeve 222 toward a position where the set of teeth 224 of the shifting sleeve 222 are to be engaged with the set of openings 210 of the transmission gear 202 and moves the shifting sleeve 218 to a position where the set of teeth 220 of the shifting sleeve 218 are disengaged from the set of openings 208 of the transmission gear 200. There is a possibility that the set of teeth 224 of the shifting sleeve 222 are misaligned with the set of openings 210 of the transmission gear 202 and as such cannot engage them. In the event that this occurs, the set of teeth 224 of the shifting sleeve 222 come into contact with portions (not shown) of the transmission gear 202 located between the openings 210. As a result of the teeth 224 coming into contact with the portions of the transmission gear 202 located between the openings 210, the shift drum shaft 138 is prevented from rotating to its low position. Even though the shift drum shaft 138 is prevented from rotating further, the shifting assembly 118 allows the shift shaft 118 to continue to rotate, and since the segment gear 128 cannot rotate, the spring 134 stores energy. As the transmission gear 202 continues to rotate, the teeth 224 of the shifting sleeve 222 are eventually aligned with the openings 210 of the transmission gear 200 and the spring 134 releases its energy, thereby moving the segment gear 128 to the position shown in FIG. 13B, which moves the shift drum shaft 138 to its low position, which also moves the shift fork 178 and shifting sleeve 222 toward the transmission gear 204 such that the teeth 224 of the shifting sleeve 222 engage the openings 210 of the transmission gear 202 as shown in FIG. 13A. Should the teeth 224 of the shifting sleeve 222 be aligned with the openings 210 of the transmission gear 204 when the gear selector 102 is moved to its low shifting position, the shift drum shaft 138 is moved to its low position, the teeth 224 of the shifting sleeve 222 are engaged with the openings 210 of the transmission gear 204 as shown in FIG. 13A. Also, the groove 170 of the shift drums 168 positions the pin 182 such that the pin 184 of the shift fork 178 is disposed adjacent to the recessed portion 166 of the radially extending wall 162 of the collar 160. The indexing wheel 142 and the indexing lever 146 ensure that the shift drum shaft 138 and the shift drums 154, 168 are in the correct angular orientation for the low position. The shift drum 154 is in its default position. In the low position, the groove 156 of the shift drums 154 positions the pin 186 such that the shift fork 180 moves the shifting sleeve 228 in a position where the set of teeth 230 of the shifting sleeve 228 are disengaged from the set of openings 212 of the transmission gear 204. In the low position of the shift drum shaft 138, the parking lock lever 236 is disengaged from the transmission gear 234 as shown in FIG. 13B. Once the teeth 224 of the shifting sleeve 222 are engaged with the openings 210 of the transmission gear 202, the rotational motion of the transmission gear 202 is transferred to the transmission shaft 196 and, as described above, to the output shaft 106, the wheels 14, and, should the all-wheel drive mode be selected, the wheels 12. When the low shifting position is selected, the ATV 10 moves forwardly, but at a lower speed than in the high shifting position for an identical speed of rotation of the input shaft 104. However, the low shifting position provides more torque than the high shifting positions for an identical speed of rotation of the input shaft 104.

When the high shifting position of the vehicle transmission 100 is selected after having selected the low shifting position, the recessed portion 166 of the radially extending wall 162 of the collar 160 comes into contact with the pin 184 and pushes the shift fork 178 away from the transmission gear 202 as the shift drum shaft 138 rotates, thus helping in disengaging the shifting sleeve 222 from the transmission gear 202.

It is contemplated that the shift drum 168 and associated components could be arranged such that the shift drum 168 would move to a pre-select position when the low shifting position is selected and the teeth 224 come into contact with the portions of the transmission gear 202 located between the openings 210, as is the case when selecting the high or reverse shifting positions.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle transmission comprising:
an input shaft;
a first input gear connected to the input shaft and rotating therewith;
a second input gear connected to the input shaft and rotating therewith;
a third input gear connected to the input shaft and rotating therewith, the second input gear being disposed between the first and the third input gears;
a transmission shaft disposed parallel to the input shaft, the input shaft selectively driving the transmission shaft;
a first transmission gear rotatably connected to the transmission shaft such that the transmission shaft can rotate independently of the first transmission gear, the first transmission gear operatively engaging the first input gear;
a second transmission gear rotatably connected to the transmission shaft such that the transmission shaft can rotate independently of the second transmission gear, the second transmission gear operatively engaging the second input gear;
a third transmission gear rotatably connected to the transmission shaft such that the transmission shaft can rotate independently of the third transmission gear, the third transmission gear operatively engaging the third input gear, the second transmission gear being disposed between the first and the third transmission gears;
a first shifting sleeve disposed on the transmission shaft between the first and second transmission gears, the first shifting sleeve being rotatably fixed to the transmission shaft for rotation therewith, the first shifting sleeve being movable axially with respect to the transmission shaft, the first shifting sleeve having a first set of teeth selectively engaging a first set of openings defined in the first transmission gear;
a second shifting sleeve disposed on the transmission shaft between the first shifting sleeve and the second transmission gear, the second shifting sleeve being rotatably fixed to the transmission shaft for rotation therewith, the second shifting sleeve being movable axially with respect to the transmission shaft, the second shifting sleeve having a second set of teeth selectively engaging a second set of openings defined in the second transmission gear;
a third shifting sleeve disposed on the transmission shaft, the second and third transmission gears being disposed between the second and third shifting sleeves, the third shifting sleeve being rotatably fixed to the transmission shaft for rotation therewith, the third shifting sleeve being movable axially with respect to the transmission shaft, the third shifting sleeve having a third set of teeth for selectively engaging a third set of openings defined in the third transmission gear;
a fork rod disposed parallel to the transmission shaft;
a first shift fork slidably disposed on the fork rod, the first shift fork extending between the first and second shifting sleeves and being operatively connected to the first and second shifting sleeves;
a second shift fork slidably disposed on the fork rod, the second shift fork being operatively connected to the third shifting sleeve;
a shift drum shaft disposed parallel to the transmission shaft, the shift drum shaft being rotatable sequentially between a first position, a second position, a third position, and a fourth position;
a first shift drum disposed on the shift drum shaft, the first shift drum being rotatably fixed to the shift drum shaft for rotation therewith, the first shift drum being movable axially with respect to the shift drum shaft between a default position and a pre-select position, the first shift drum operatively engaging the first fork;
a first spring biasing the first shift drum toward the default position of the first shift drum;
a second shift drum disposed on the shift drum shaft, the second shift drum being rotatably fixed to the shift drum shaft for rotation therewith, the second shift drum being movable axially with respect to the shift drum shaft between a default position and a pre-select position, the second shift drum operatively engaging the second fork;
a second spring biasing the second shift drum toward the default position of the second shift drum; and
an output shaft operatively connected to the transmission shaft, the transmission shaft driving the output shaft.

2. The vehicle transmission of claim 1, wherein:
when the shift drum shaft is rotated to the first position:
the first shift fork is moved toward the first transmission gear with the first shifting sleeve,
if the first set of teeth of the first shifting sleeve is aligned with the first set of openings of the first transmission gear, the first shift drum is in the default position, the first set of teeth engages the first set of openings and the transmission shaft is driven by the first transmission gear,
if the first set of teeth of the first shifting sleeve is misaligned with the first set of openings of the first transmission gear, the first shift drum moves to the pre-select position until the first set of teeth is aligned with the first set of openings, when the first set of teeth is aligned with the first set of openings, the first spring biases the first shift drum to the default position thereby engaging the first set of teeth with the first set of openings and the transmission shaft is driven by the first transmission gear,
the second set of teeth of the second shifting sleeve is disengaged from the second set of openings of the second transmission gear,
the second shift drum is in the default position, and
the third set of teeth of the third shifting sleeve is disengaged from the third set of openings of the third transmission gear;
when the shift drum shaft is rotated to the second position:
the first shift drum is in the default position,
the first set of teeth of the first shifting sleeve is disengaged from the first set of openings of the first transmission gear,
the second set of teeth of the second shifting sleeve is disengaged from the second set of openings of the second transmission gear,
the second shift drum is in the default position, and
the third set of teeth of the third shifting sleeve is disengaged from the third set of openings of the third transmission gear;
when the shift drum shaft is rotated to the third position:
the first shift drum is in the default position,
the first set of teeth of the first shifting sleeve is disengaged from the first set of openings of the first transmission gear,
the second set of teeth of the second shifting sleeve is disengaged from the second set of openings of the second transmission gear,
the second shift fork is moved toward the third transmission gear with the third shifting sleeve,
if the third set of teeth of the third shifting sleeve is aligned with the third set of openings of the third transmission gear, the second shift drum is in the default position, the third set of teeth engages the third set of openings and the transmission shaft is driven by the third transmission gear, and
if the third set of teeth of the third shifting sleeve is misaligned with the third set of openings of the third transmission gear, the second shift drum moves to the pre-select position until the third set of teeth is aligned with the third set of openings, when the third set of teeth is aligned with the third set of openings, the second spring biases the second shift drum to the default position thereby engaging the third set of teeth with the third set of openings and the transmission shaft is driven by the third transmission gear; and
when the shift drum shaft is rotated to the fourth position:
the first shift drum is in the default position,
the first shift fork is moved toward the second transmission gear with the second shifting sleeve,
the first set of teeth of the first shifting sleeve is disengaged from the first set of openings of the first transmission gear,
the second set of teeth of the second shifting sleeve is engaged with the second set of openings of the second transmission gear and the transmission shaft is driven by the second transmission gear,
the second shift drum is in the default position, and
the third set of teeth of the third shifting sleeve is disengaged from the third set of openings of the third transmission gear.

3. The vehicle transmission of claim 2, wherein, for an identical speed of rotation of the input shaft, a speed of rotation of the output shaft is greater when the third transmission gear drives the transmission shaft than when the second transmission gear drives the transmission shaft.

4. The vehicle transmission of claim 2 or 3, further comprising:
a fourth transmission gear fixedly connected to the transmission for rotation therewith, the fourth transmission gear being operatively connected to the output shaft, the fourth transmission gear operatively driving the output shaft; and
a parking lock lever selectively engaging the fourth transmission gear;
wherein the shift drum shaft has a park position and the shift drum shaft is rotatable sequentially between the park position, the first position, the second position, the third position, and the fourth position;
wherein when the shift drum shaft is rotated to the park position:
the first shift drum is in the default position,
the first set of teeth of the first shifting sleeve is disengaged from the first set of openings of the first transmission gear,
the second set of teeth of the second shifting sleeve is disengaged from the second set of openings of the second transmission gear,
the second shift drum is in the default position,
the third set of teeth of the third shifting sleeve is disengaged from the third set of openings of the third transmission gear, and
the parking lock lever engages the fourth transmission gear, thus preventing rotation of the transmission shaft and of the output shaft; and
wherein when the shift drum shaft is rotated to any one of the first, second, third, and fourth positions the parking lock lever is disengaged from the fourth transmission gear.

5. The vehicle transmission of claim 4, wherein the parking lock lever is rotatably disposed on the fork rod; and
further comprising an eccentric connected to the shift drum shaft, the eccentric being disposed inside an opening in the parking lock lever and moving the parking lock lever as the shift drum shaft rotates.

6. The vehicle transmission of claim 1, further comprising a fourth transmission gear fixedly connected to the transmission for rotation therewith, the fourth transmission gear being operatively connected to the output shaft, the fourth transmission gear operatively driving the output shaft.

7. The vehicle transmission of claim 4, further comprising:
an intermediate shaft disposed parallel to the input shaft;
an intermediate gear connected to the intermediate shaft and rotating therewith, the intermediate gear being driven by the fourth transmission gear;

a first bevel gear connected to the intermediate shaft and rotating therewith;

a second bevel gear connected to the output shaft, the second bevel gear being driven by the first bevel gear, the output shaft being perpendicular to the input shaft.

8. The vehicle transmission of claim 1, further comprising an idler gear driven by the first input gear and driving the first transmission gear, the first transmission gear rotating in a direction opposite to a direction of rotation of the second and third transmission gears.

9. The vehicle transmission of claim 1, wherein:
the first shift drum defines a first groove;
the first shift fork has a first pin received in the first groove;
the second shift drum defines a second groove; and
the second shift fork has a second pin received in the second groove.

10. The vehicle transmission of claim 9, further comprising a collar disposed on the shift drum shaft for rotation therewith, the first spring being disposed between the first shift drum and the collar, the collar defining a radially extending wall having a straight portion and a recessed portion;
wherein the first shift fork has a third pin, the third pin being disposed adjacent to the straight portion of the radially extending wall when the shift drum shaft is in the second and third positions, and the third pin being disposed adjacent the recessed portion of the radially extending wall when the shift drum shaft is in the fourth position.

11. The vehicle transmission of claim 10, wherein the first spring is a coil spring disposed around the shift drum shaft between the collar and the first shift drum.

12. The vehicle transmission of claim 1, wherein the first and second springs are coil springs disposed around the shift drum shaft.

13. The vehicle transmission of claim 1, wherein the first and second shifting sleeves are integrally formed.

14. The vehicle transmission of claim 1, further comprising:
a shift shaft disposed parallel to the shift drum shaft;
a drive gear disposed on the shift drum shaft and rotating therewith; and
a shifting assembly connected to the shift shaft, the shifting assembly operatively engaging the drive gear for rotating the shift drum shaft between the first, second, third, and fourth positions.

15. A vehicle comprising:
an engine;
a vehicle transmission according to claim 1, the input shaft of the vehicle transmission being operatively connected to the engine;
at least three wheels, at least one of the at least three wheels being operatively connected to the output shaft of the vehicle transmission; and
a gear selector operatively connected to the shift drum shaft of the vehicle transmission.

* * * * *

UNITED STATES PATENT AND TRADEMARK OFFICE
CERTIFICATE OF CORRECTION

PATENT NO. : 8,910,535 B2
APPLICATION NO. : 13/696209
DATED : December 16, 2014
INVENTOR(S) : Markus Hochmayr et al.

Page 1 of 1

It is certified that error appears in the above-identified patent and that said Letters Patent is hereby corrected as shown below:

In the Claims

Claim 4, Column 16, line 19, "of claim 2 or 3" should read -- of claim 2 --.

Signed and Sealed this
Seventh Day of April, 2015

Michelle K. Lee
*Director of the United States Patent and Trademark Office*